United States Patent [19]

Hamanishi

[11] Patent Number: 4,468,096
[45] Date of Patent: Aug. 28, 1984

[54] FOUR-GROUP TELEPHOTO ZOOM LENS
[75] Inventor: Yoshinari Hamanishi, Tokyo, Japan
[73] Assignee: Nippon Kogaku K.K., Tokyo, Japan
[21] Appl. No.: 346,995
[22] Filed: Feb. 8, 1982
[30] Foreign Application Priority Data
  Feb. 23, 1981 [JP] Japan .................... 56-25073
[51] Int. Cl.³ .................. G02B 9/64; G02B 15/18
[52] U.S. Cl. .................................... 350/427
[58] Field of Search ............................ 350/427
[56] References Cited
  U.S. PATENT DOCUMENTS
  4,025,167  5/1977  Ikeda ...................... 350/427
  4,223,981  9/1980  Mizutani et al. ........... 350/184
  FOREIGN PATENT DOCUMENTS
  0464882  7/1975  U.S.S.R. .

Primary Examiner—John K. Corbin
Assistant Examiner—Rebecca D. Gass
Attorney, Agent, or Firm—Shapiro and Shapiro

[57] ABSTRACT

A four-group zoom lens includes, in succession from the object side, a first group having a positive refractive power and movable on the optical axis for focusing, a second group having a negative refractive power and movable on the optical axis to vary the total focal length of the entire system, a third group having a positive refractive power and movable on the optical axis to keep the image plane at a predetermined position, and a fourth group as a relay lens system having a positive refractive power. The second group has a cemented lens component comprising three negative, positive and negative lenses cemented together and having a composite negative refractive power, and a negative lens component.

10 Claims, 83 Drawing Figures

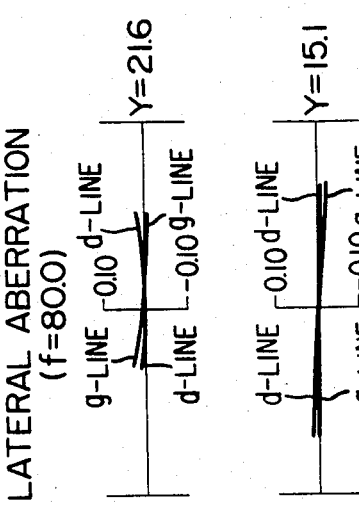
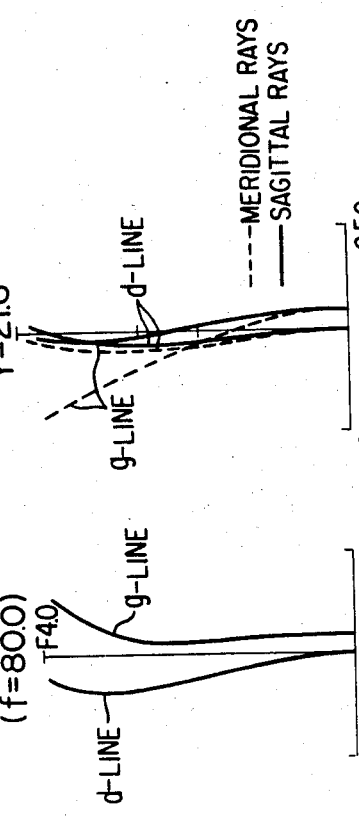
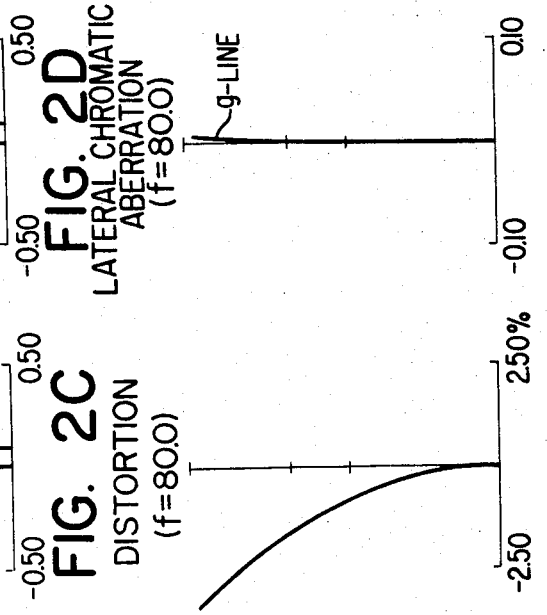
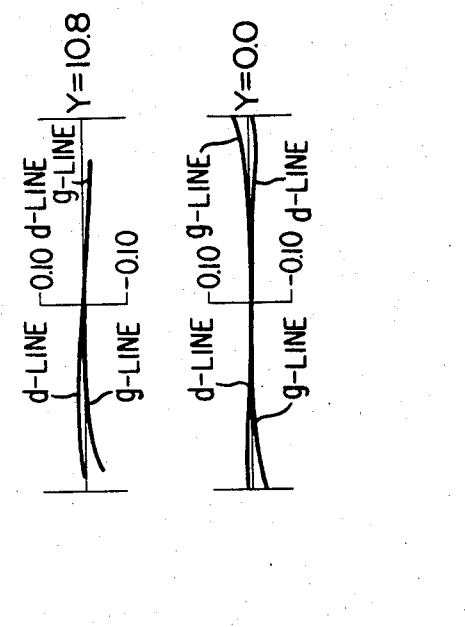

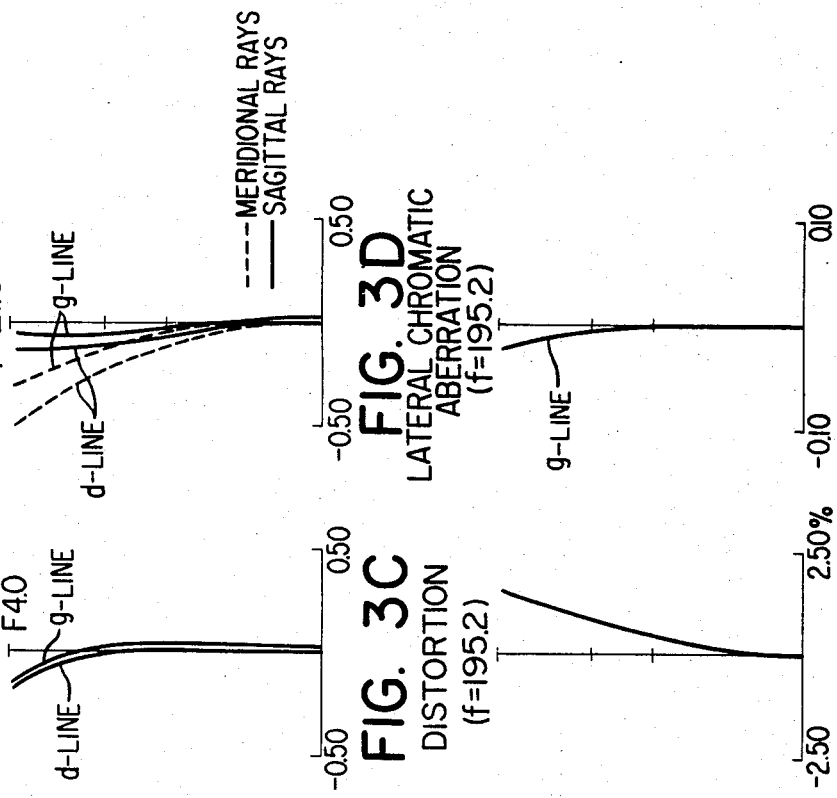

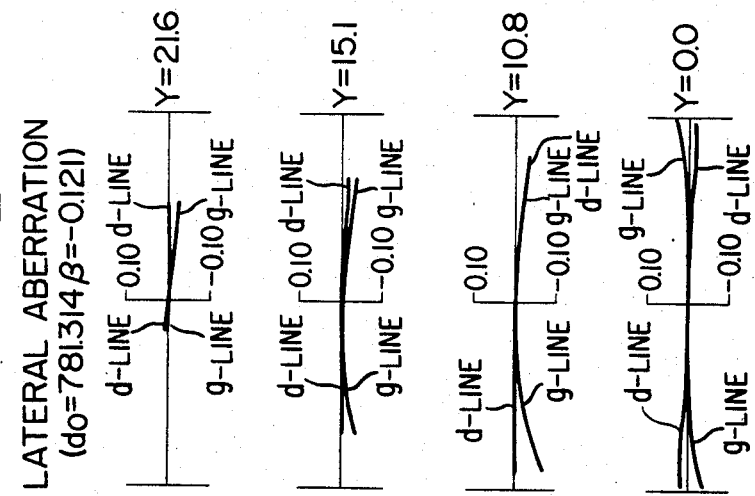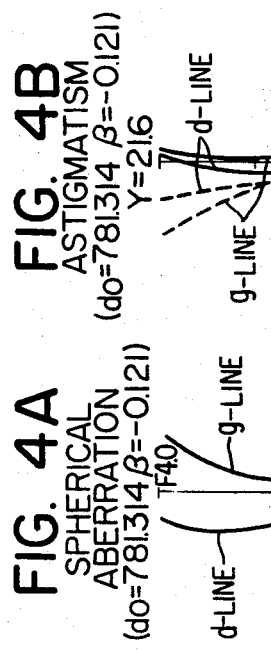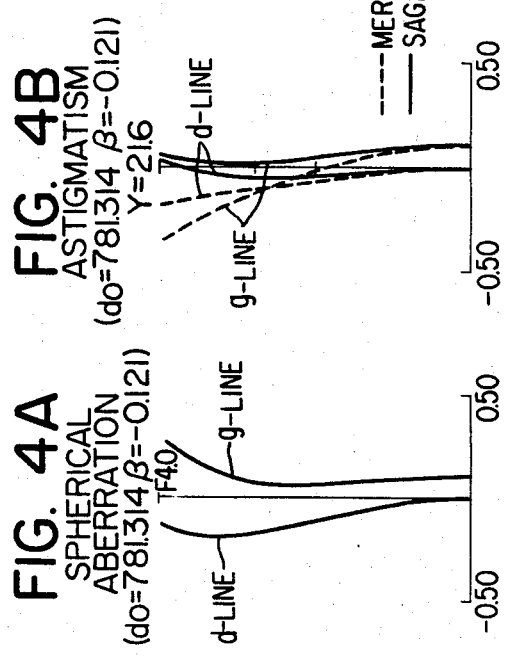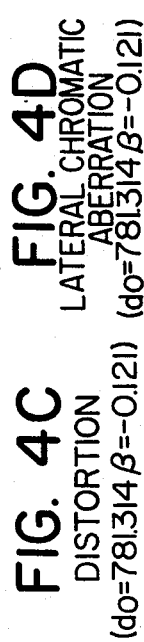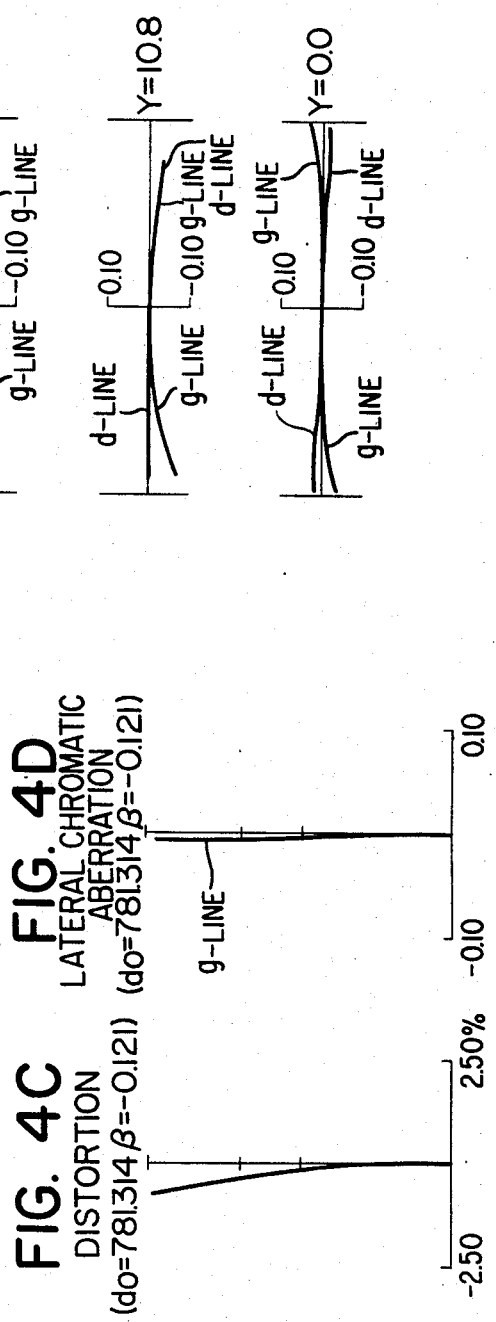

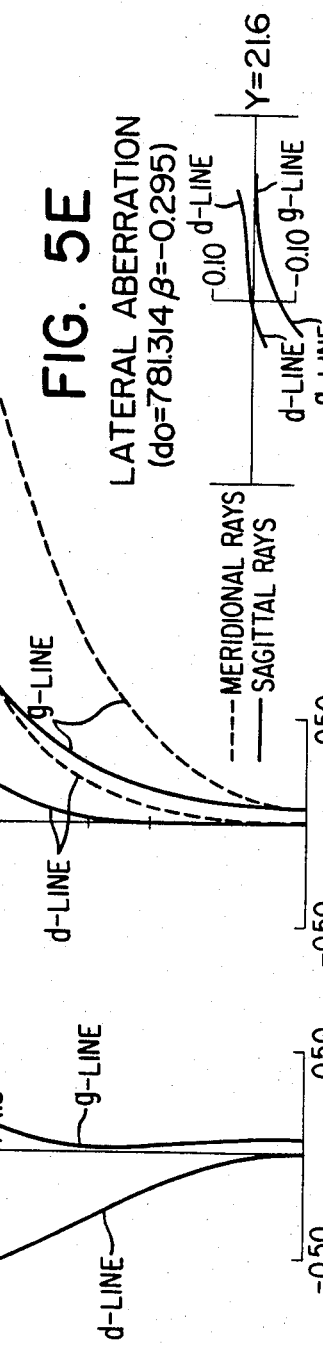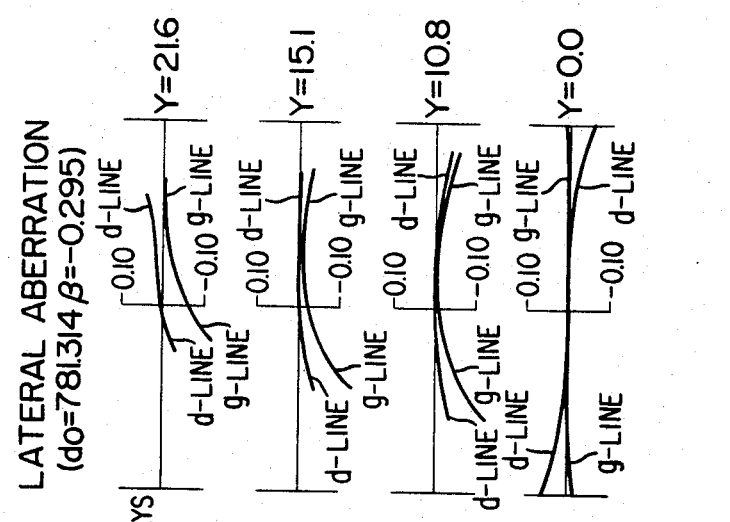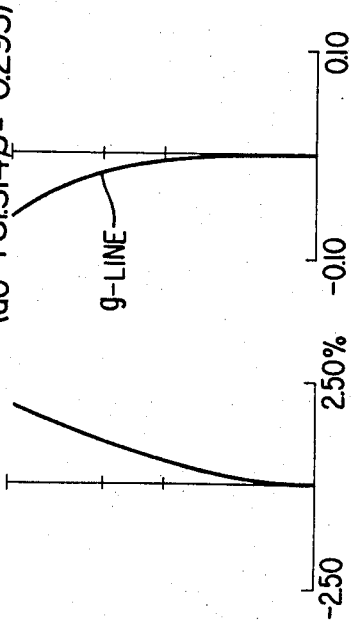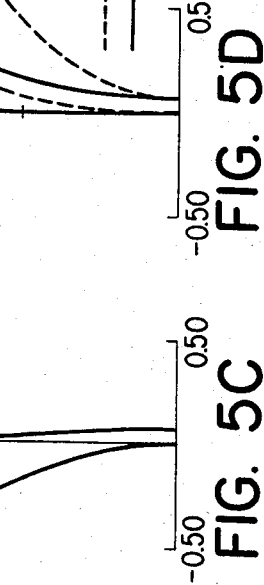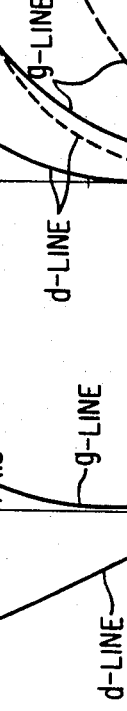

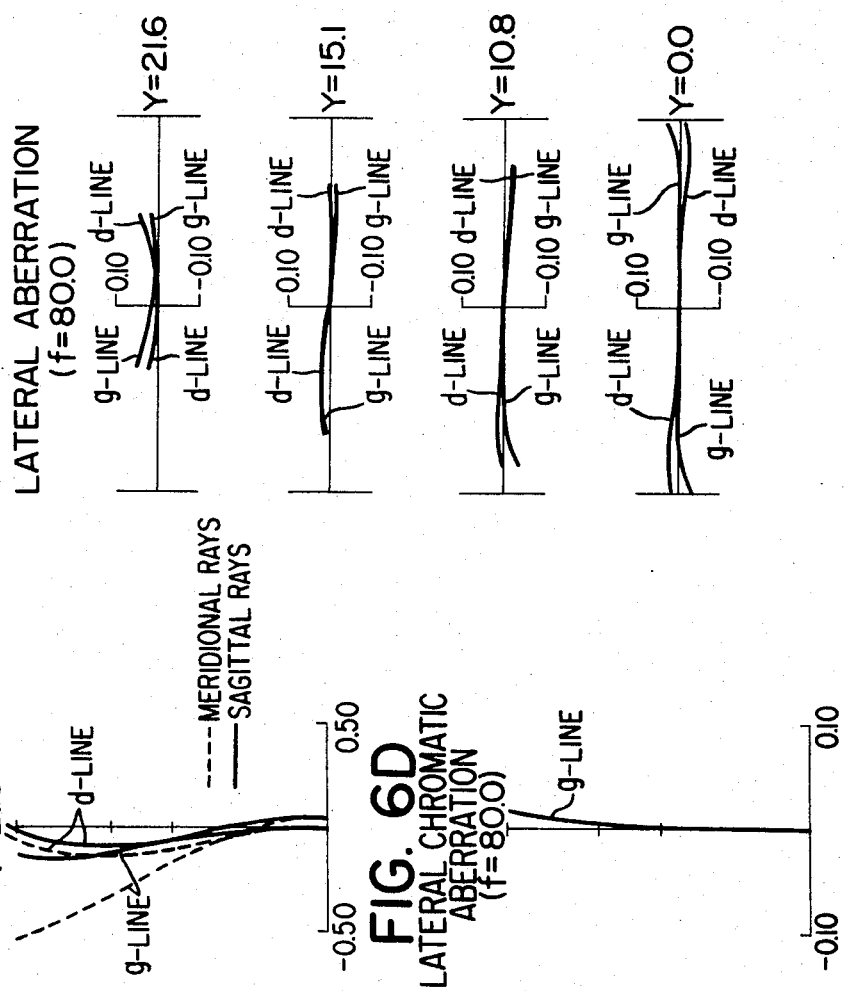
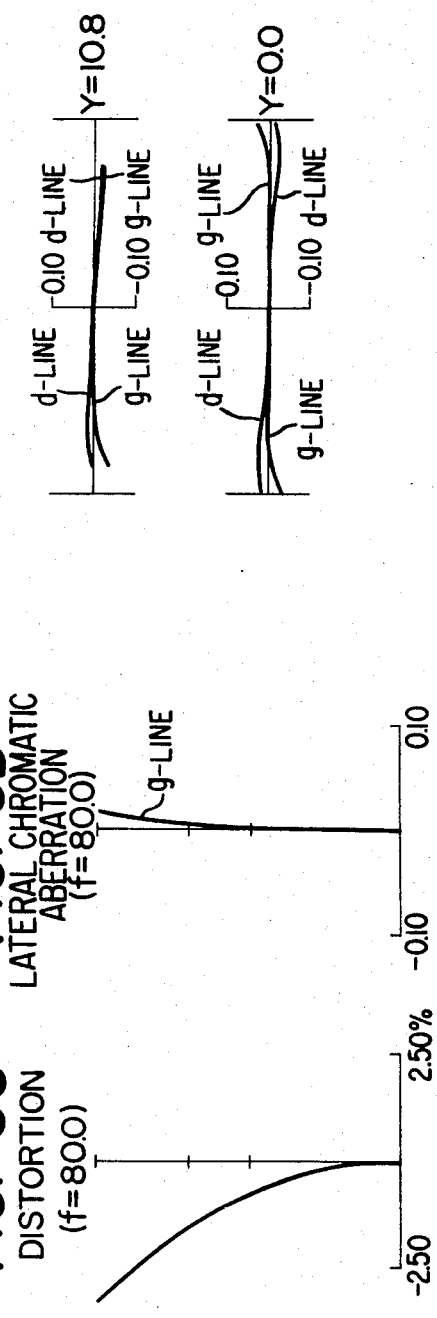
FIG. 6A SPHERICAL ABERRATION (f=80.0)
FIG. 6B ASTIGMATISM (f=80.0) Y=21.6
FIG. 6C DISTORTION (f=80.0)
FIG. 6D LATERAL CHROMATIC ABERRATION (f=80.0)
FIG. 6E LATERAL ABERRATION (f=80.0)

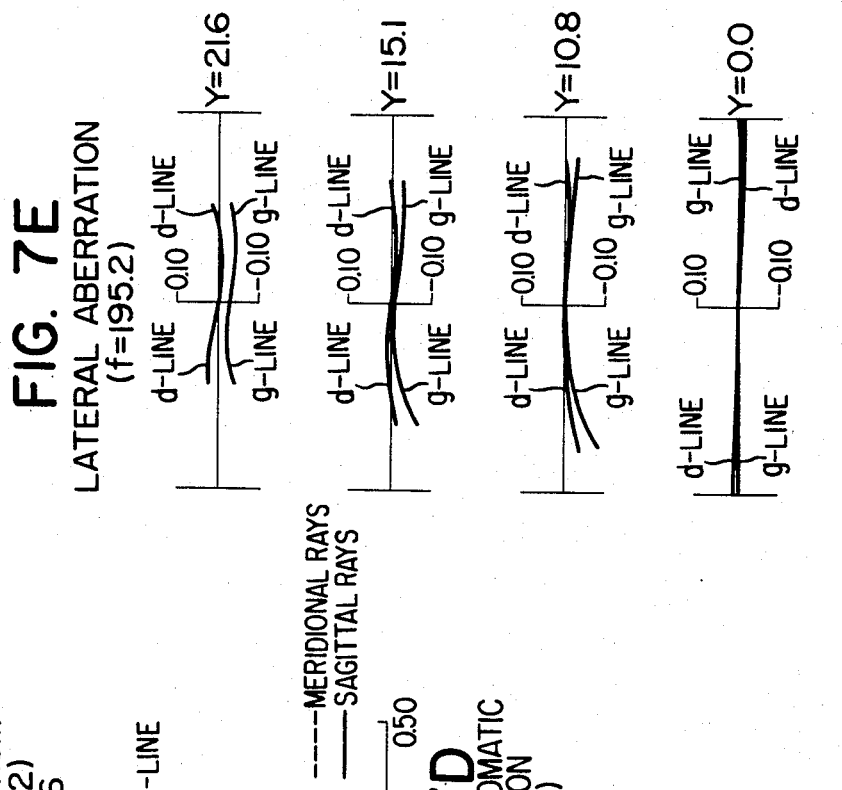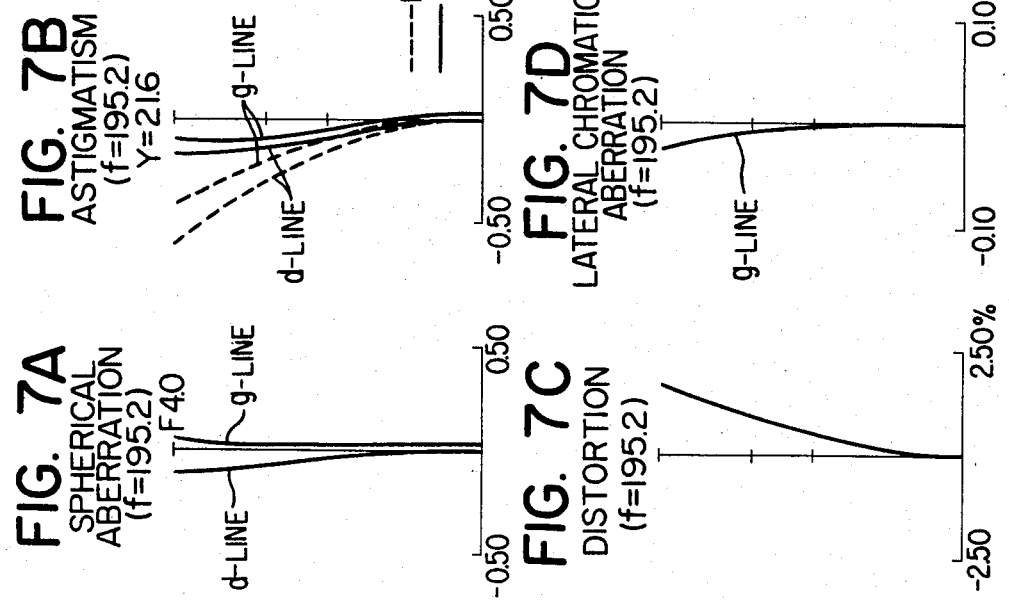

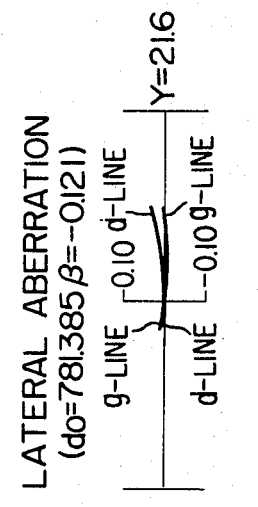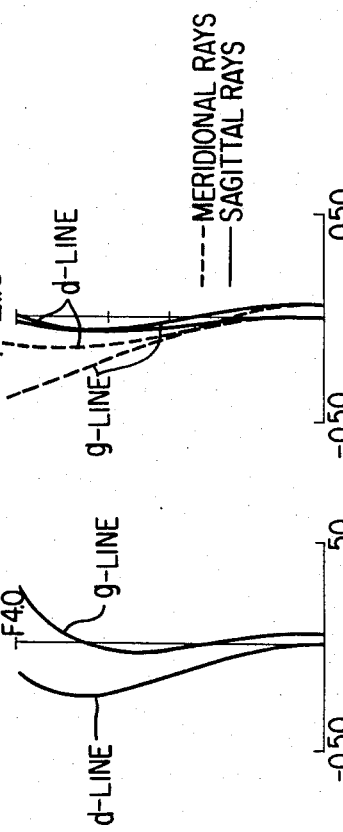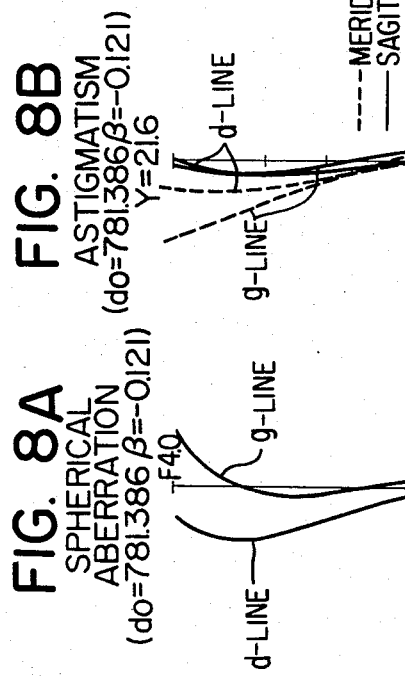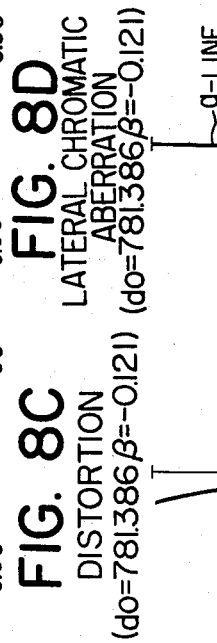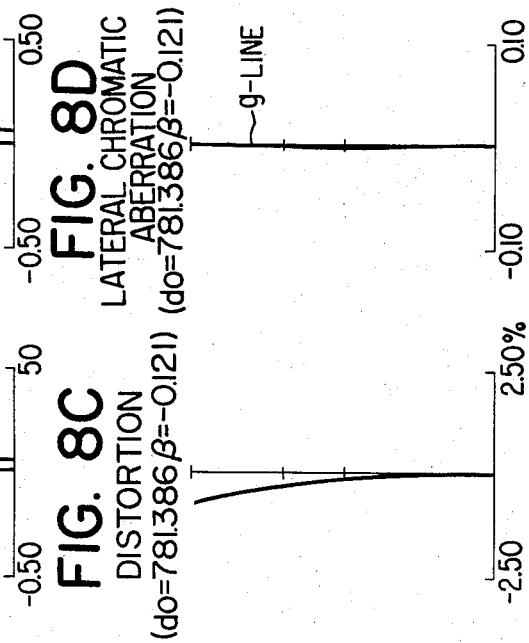

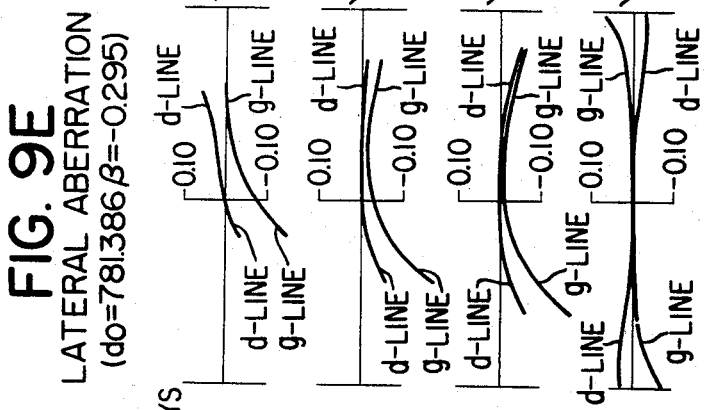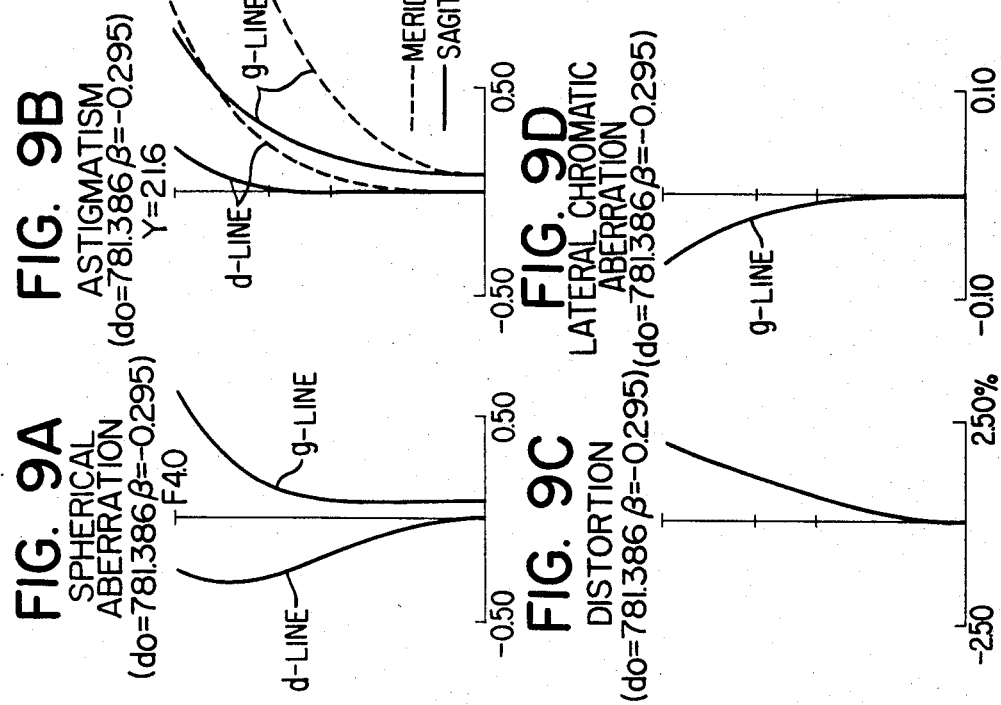

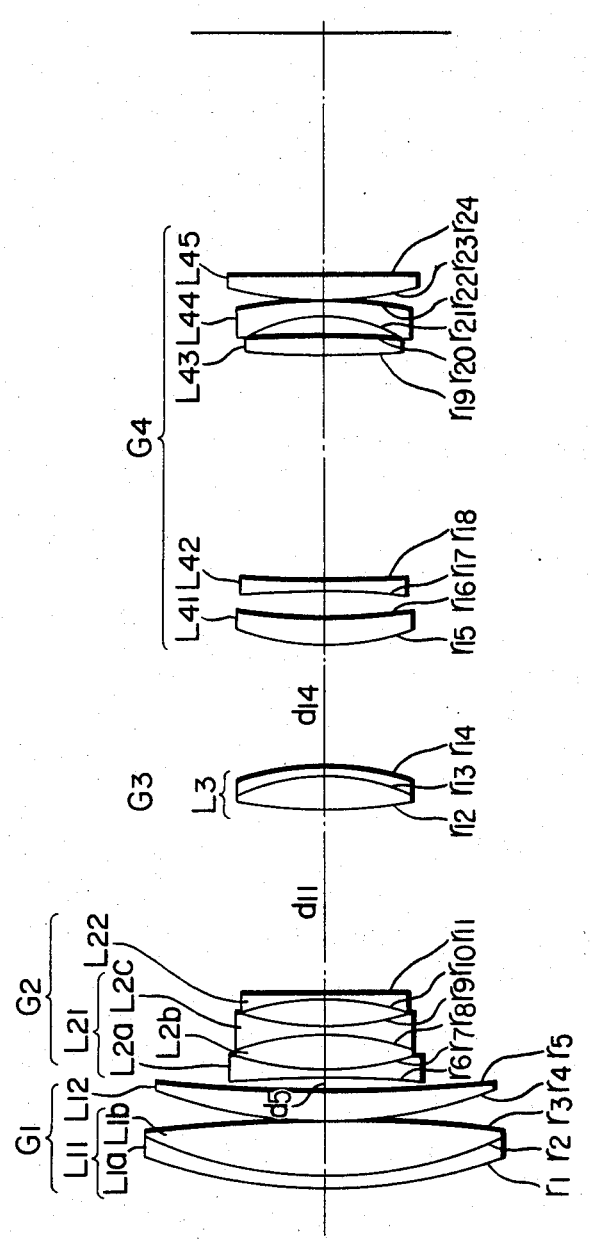

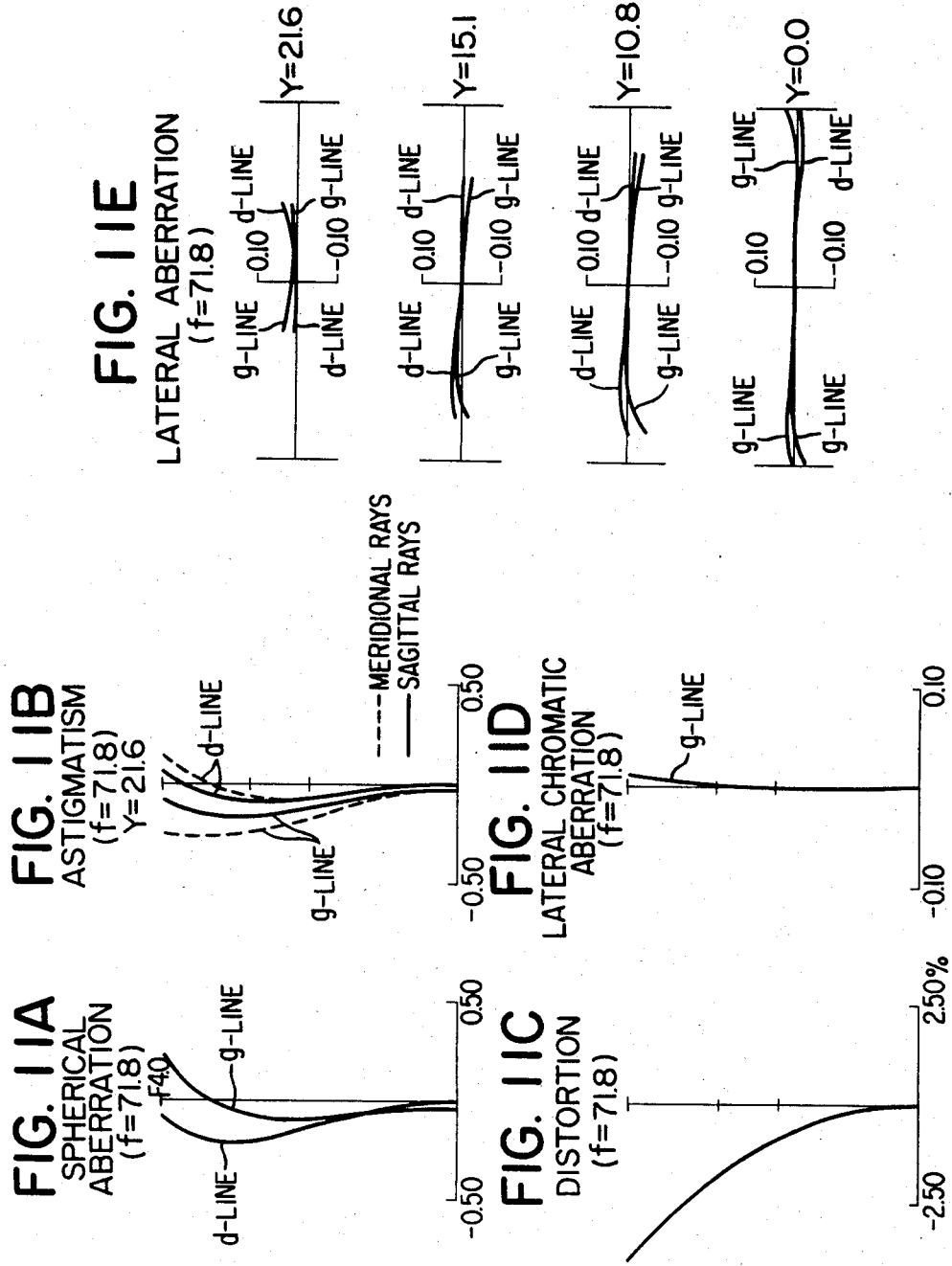

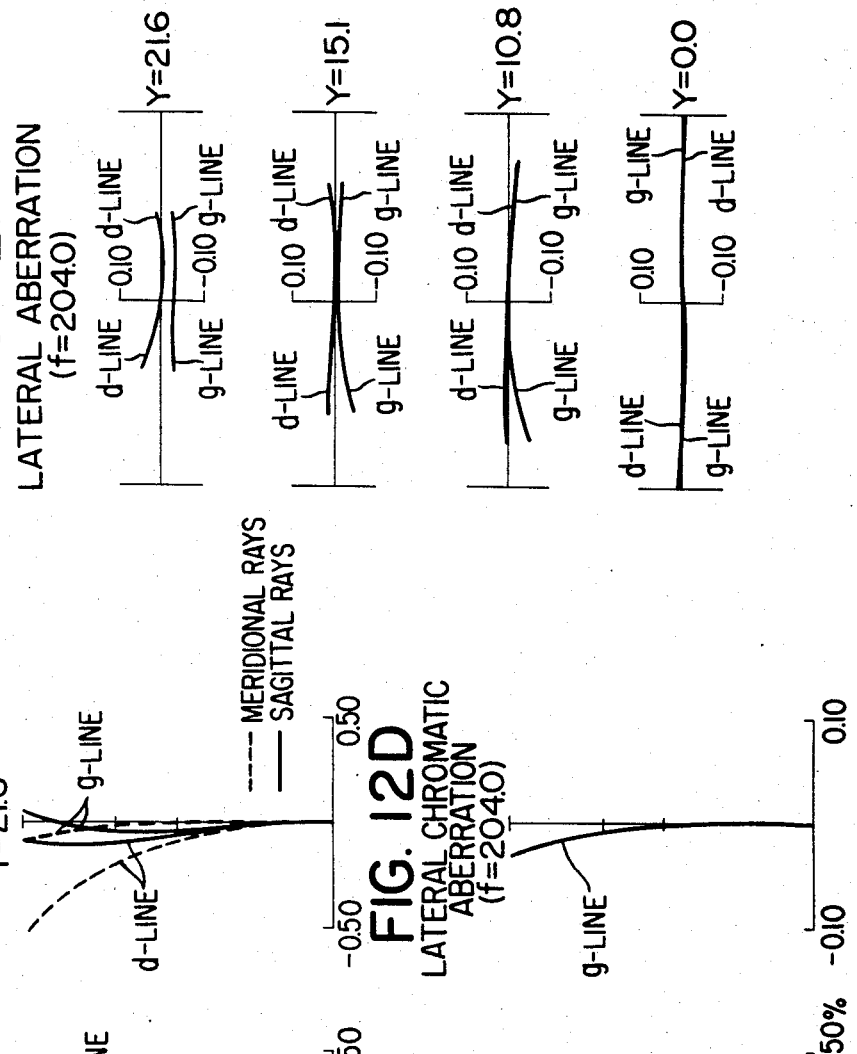

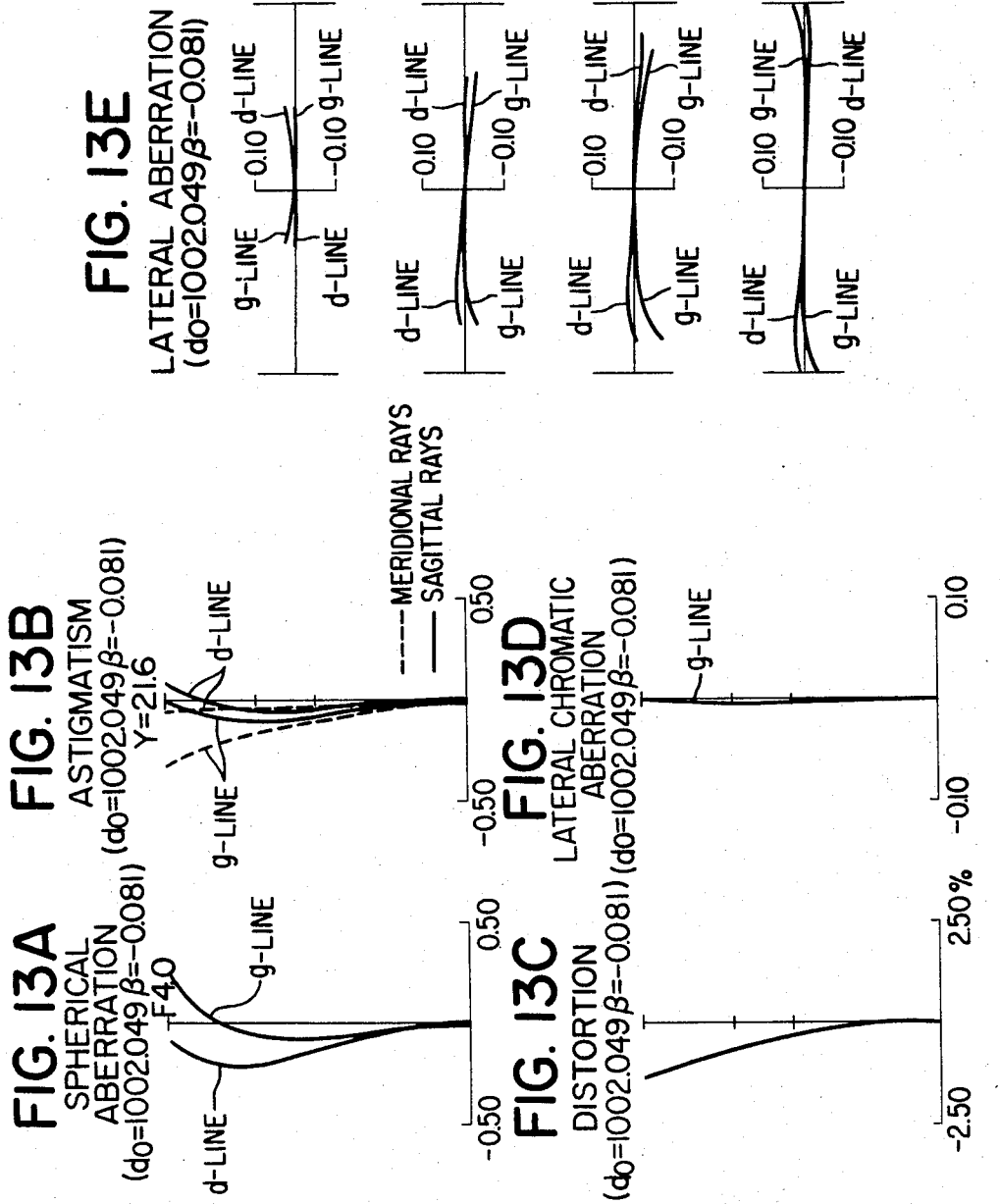

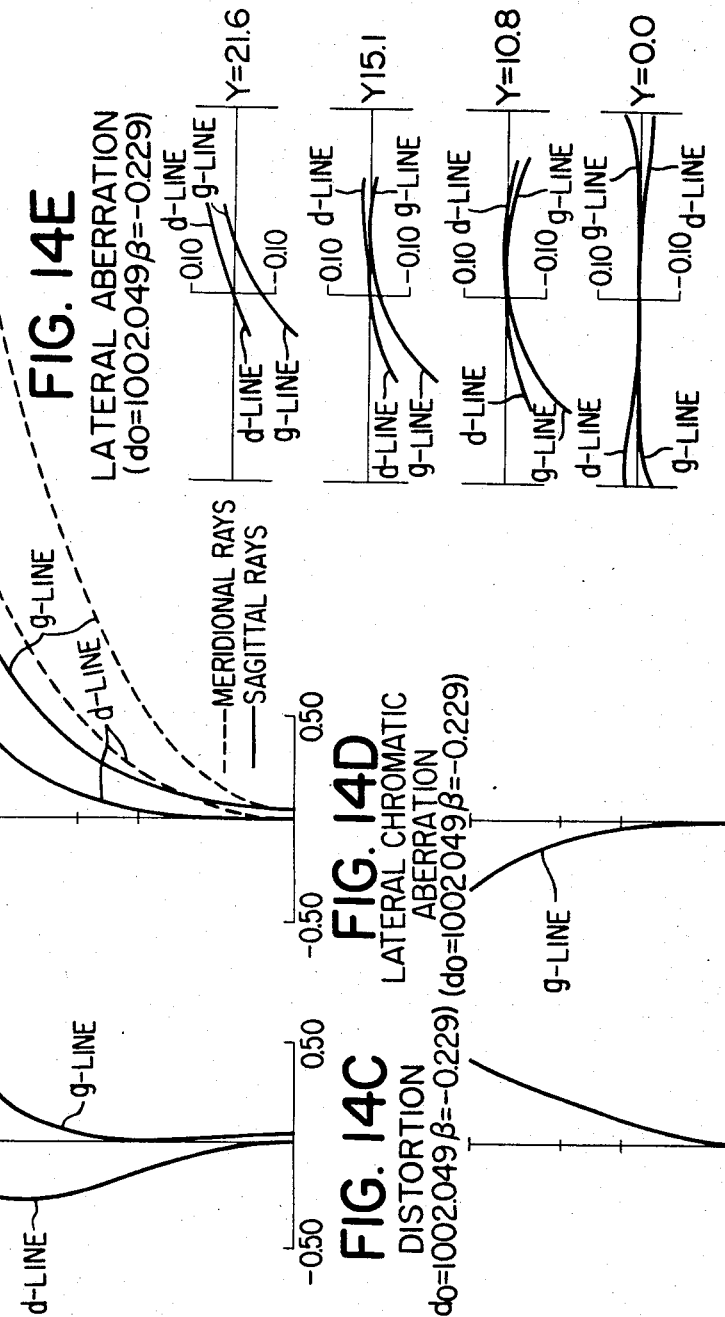

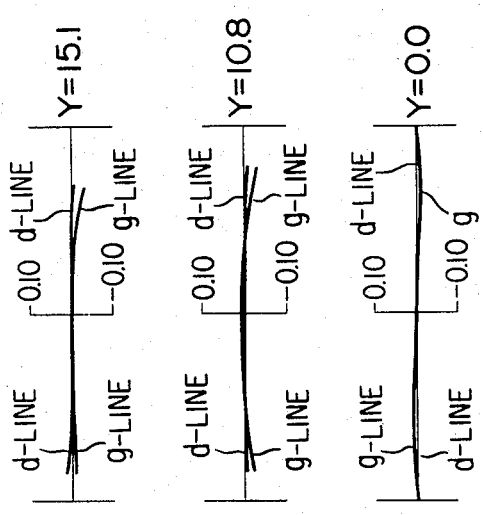
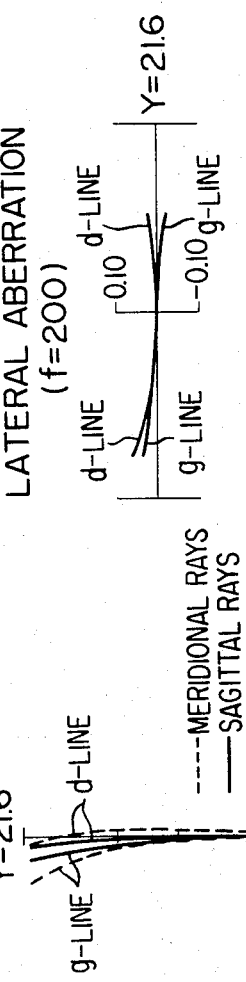
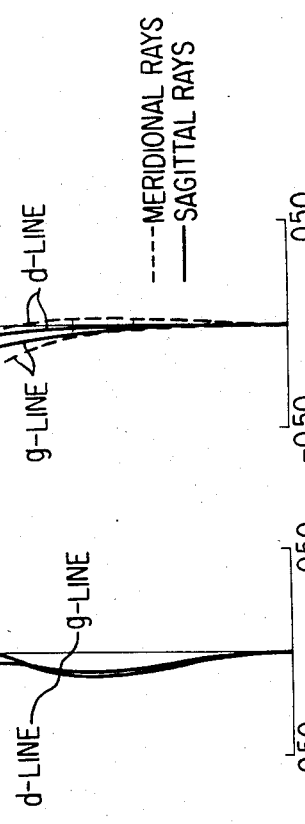
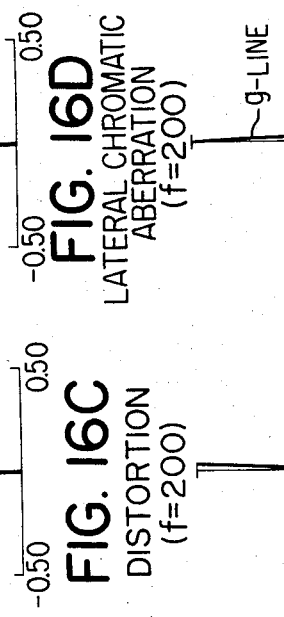
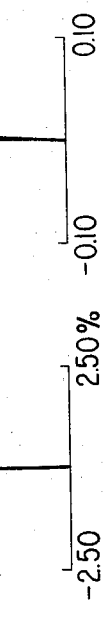
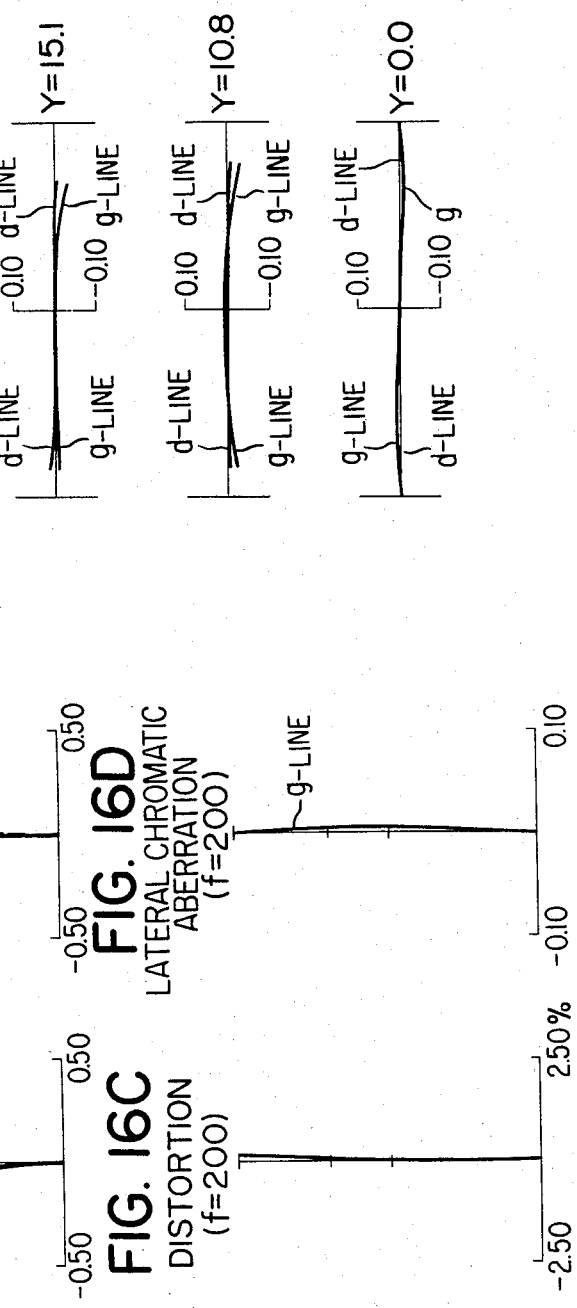

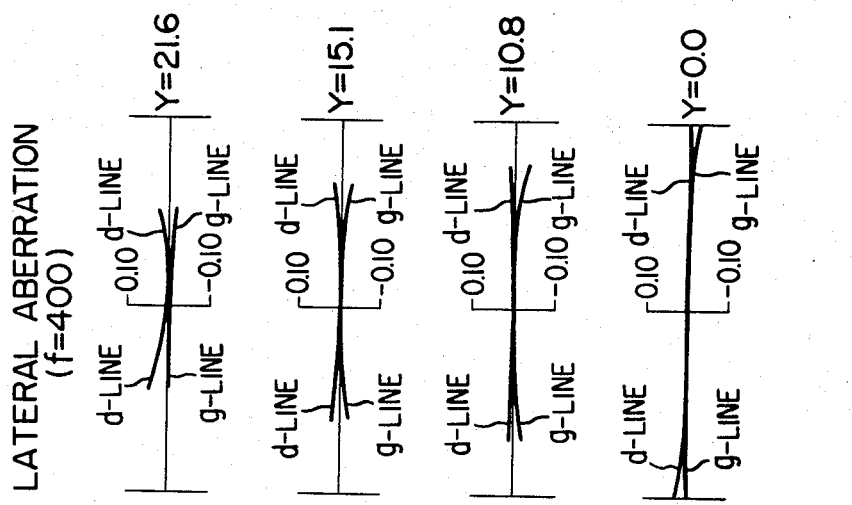
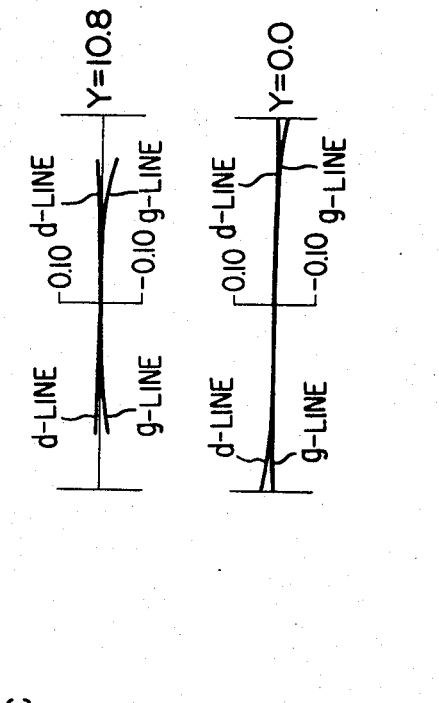
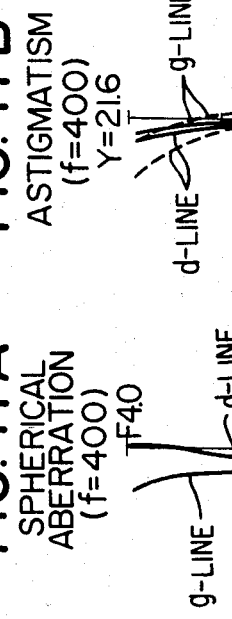
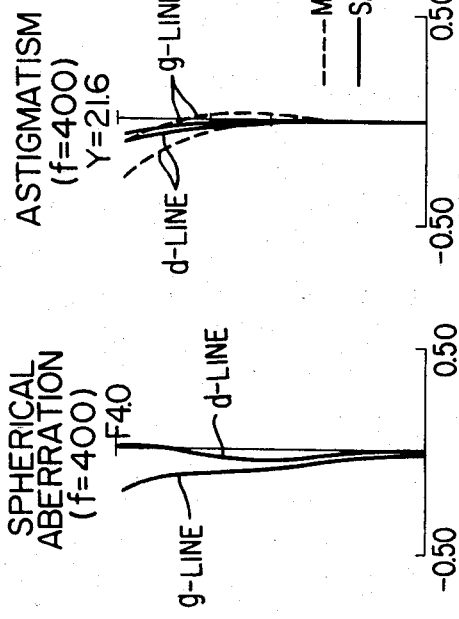
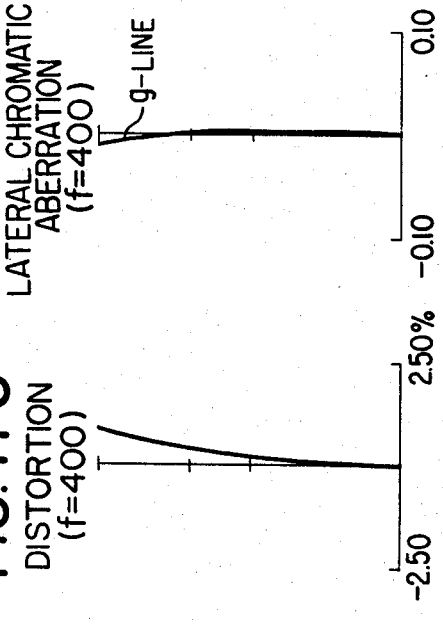

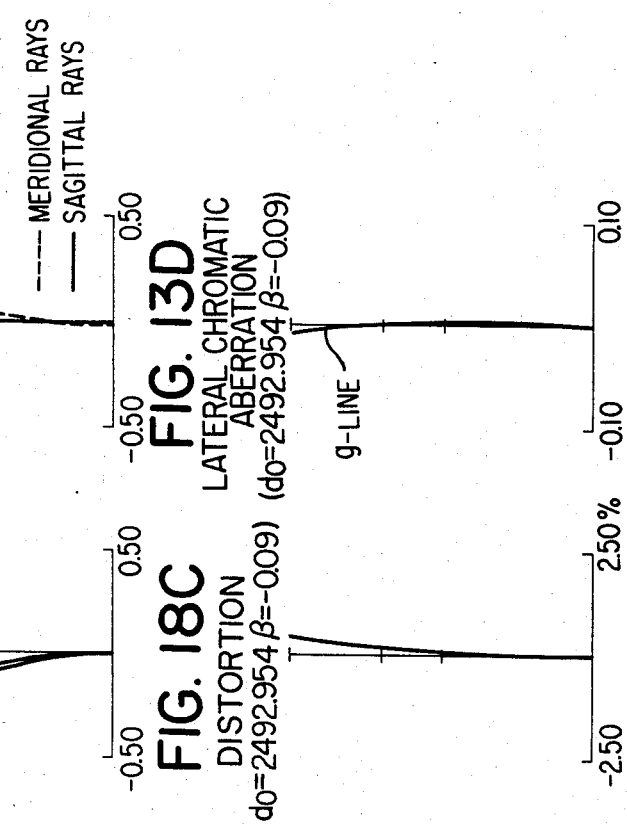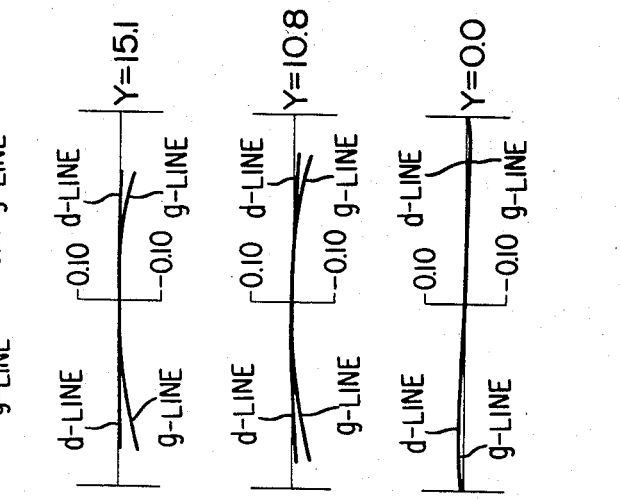

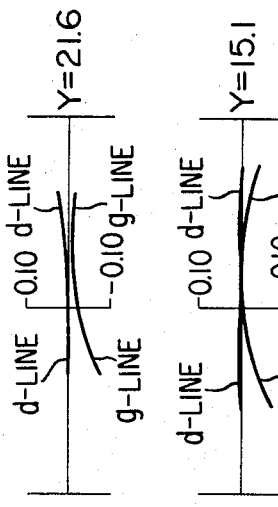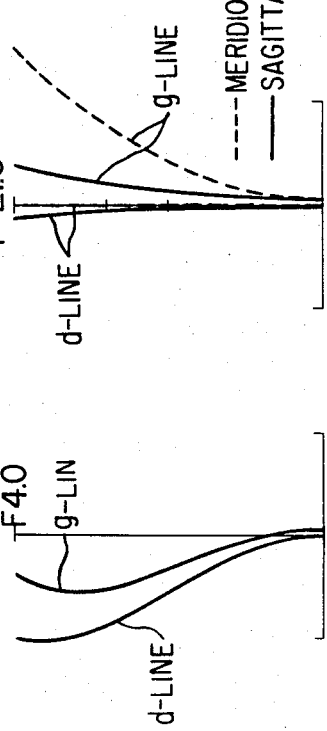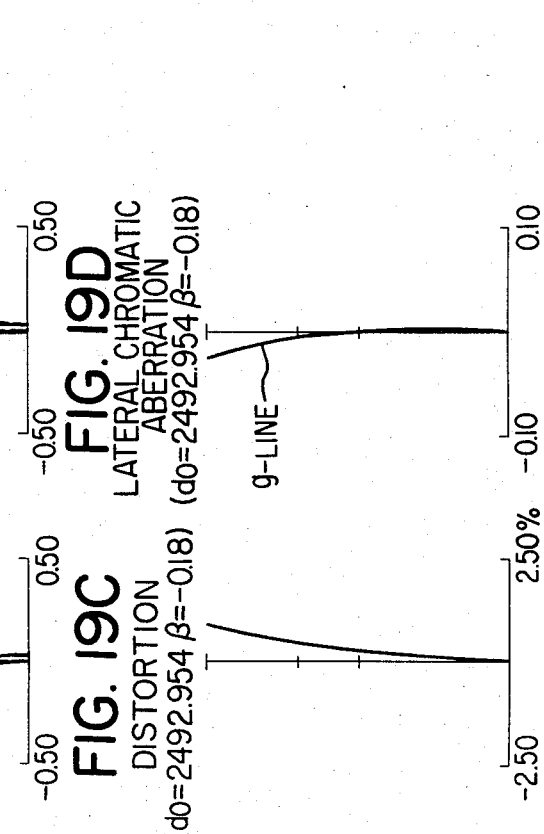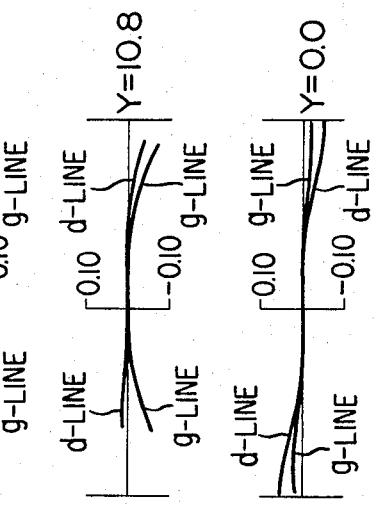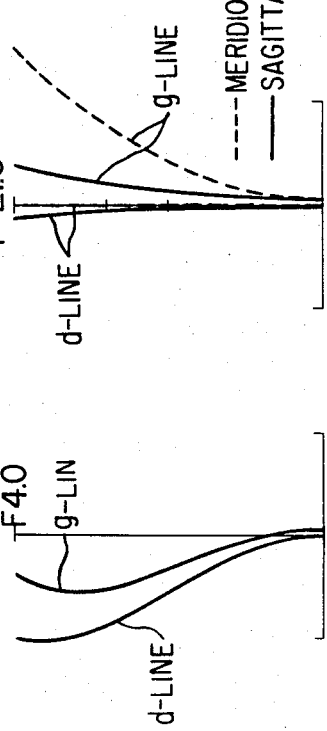

FOUR-GROUP TELEPHOTO ZOOM LENS

BACKGROUND OF THE INVENTION

1. Field of the Invention

This invention relates to a telephoto zoom lens, and more particularly to improvements in a four-group zoom lens comprising, in succession from the object side, a focusing lens group, a magnification changing lens group, a compensating lens group and a relay lens group.

2. Description of the Prior Art

Zoom lenses are optical systems of very high utility and excellent zoom lenses of this type have been developed. However, as compared with fixed focus lenses, such zoom lenses do not yet have a sufficient optical performance and it has been desired that the zoom lenses satisfy a performance and specification similar to those of fixed focus lenses. Particularly, it has been very difficult due to the fluctuations of chromatic aberration and other residual aberrations to maintain a stable imaging performance over the entire magnification change range even if zooming is effected, and further, aggravation of the various aberrations in short distance photography has been remarkable and, as compared with fixed focus lenses, the zoom lenses have required a long photographing distance and they have been disadvantageous to effect photography at short distances.

SUMMARY OF THE INVENTION

It is an object of the present invention to provide a four-group telephoto zoom lens which has an excellent imaging performance over the entire range of the magnification change resulting from zooming and yet can maintain a high imaging performance even for objects at short distances.

The invention will become fully apparent from the following detailed description thereof taken in conjunction with the accompanying drawings.

BRIEF DESCRIPTION OF THE DRAWINGS

FIGS. 2A–2E illustrate the various aberrations for an infinity object in the shortest focal length condition (f=80.0) of the first embodiment.

FIGS. 3A–3E illustrate the various aberrations for an infinity object in the longest focal length condition (f=195.2) of the first embodiment.

FIGS. 4A–4E illustrate the various aberrations for a short distance object in the shortest focal length condition of the first embodiment.

FIGS. 5A–5E illustrate the various aberrations for a short distance object in the longest focal length condition of the first embodiment.

FIGS. 6A–6E illustrate the various aberrations for an infinity object in the shortest focal length condition of a second embodiment.

FIGS. 7A–7E illustrate the various aberrations for an infinity object in the lengest focal length condition of the second embodiment.

FIGS. 8A–8E illustrate the various aberrations for a short distance object in the shortest focal length condition of the second embodiment.

FIGS. 9A–9E illustrate the various aberrations for a short distance object in the longest focal length condition of the second embodiment.

FIG. 10 shows the lens construction of a third embodiment of the present invention.

FIGS. 11A–11E illustrate the various aberrations for an infinity object in the shortest focal length condition (f=71.8) of the third embodiment.

FIGS. 12A–12E illustrate the various aberrations for an infinity object in the longest focal length condition (f=204.0) of the third embodiment.

FIGS. 13A–13E illustrate the various aberrations for a short distance object in the shortest focal length condition of the third embodiment.

FIGS. 14A–14E illustrate the various aberrations for a short distance object in the longest focal length condition of the third embodiment.

FIGS. 16A–16E illustrate the various aberrations for an infinity object in the shortest focal length condition (f=200.0) of the fourth embodiment.

FIGS. 17A–17E illustrate the various aberrations for an infinity object in the longest focal length condition (f=400) of the fourth embodiment.

FIGS. 18A–18E illustrates the various aberrations for a short distance object in the shortest focal length condition of the fourth embodiment.

FIGS. 19A–19E illustrate the various aberrations for a short distance object in the longest focal length condition of the fourth embodiment.

DESCRIPTION OF THE PREFERRED EMBODIMENTS

Figure 1:
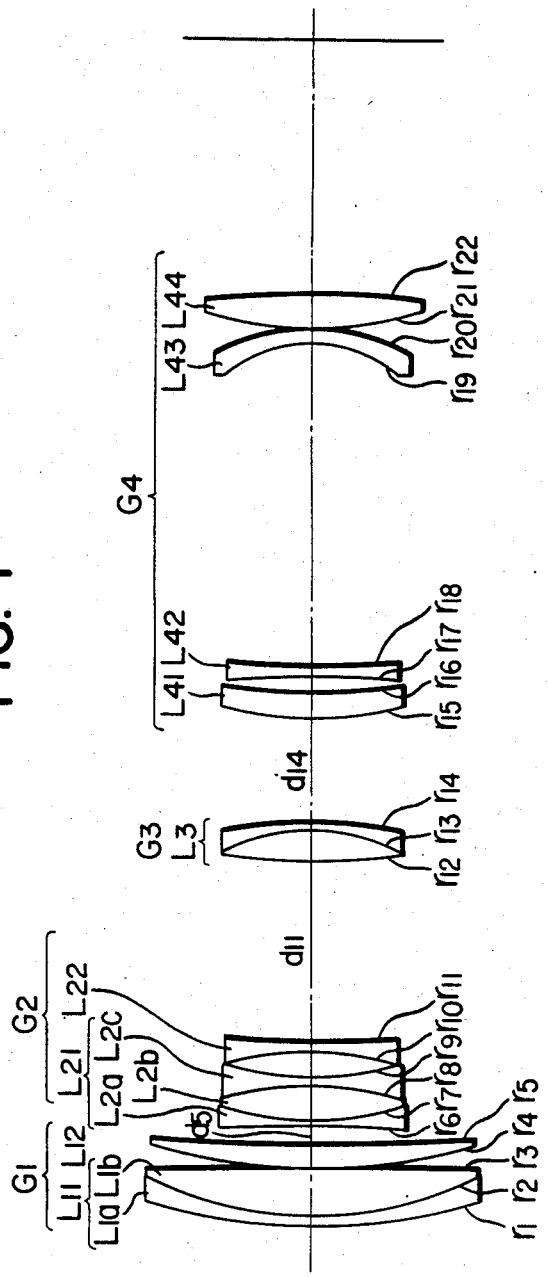
FIG. 1 shows the lens construction of a first embodiment of the present invention.

The zoom lens according to the present invention is a four-group zoom lens which includes, in succession from the object side, a first group $G_1$ having a positive refractive power and movable on the optical axis for focusing, a second group $G_2$ having a negative refractive power and movable on the optical axis to change the total focal length of the entire system, a third group $G_3$ having a positive refractive power and movable on the optical axis to keep the image plane at a predetermined position, and a fourth group $G_4$ as a relay lens system having a positive refractive power, the second group $G_2$ comprising, in succession from the object side, a cemented lens component $L_{21}$ consisting of three negative, positive and negative lenses $L_{2a}$, $L_{2b}$ and $L_{2c}$ cemented together and having a composite negative refractive power, and a negative lens component $L_{22}$. This zoom lens satisfies the following conditions:

$$1.0 < \frac{f_{21}}{f_{22}} < 1.9 \tag{1}$$

$$0.5 < \frac{r_{11} + r_{10}}{r_{11} - r_{10}} < 1.2 \tag{2}$$

$$-0.1 < f_{21}\left(\frac{1}{f_{2a}\nu_{2a}} + \frac{1}{f_{2b}\nu_{2b}}\right) < -0.03 \tag{3}$$

$$-0.07 < f_{21}\left(\frac{1}{f_{2b}\nu_{2b}} + \frac{1}{f_{2c}\nu_{2c}}\right) < -0.03 \tag{4}$$

$$0.1 < n_5 - n_6 < 0.3 \tag{5}$$

where $f_{21}$ and $f_{22}$ represent the focal lengths of the cemented negative lens component $L_{21}$ and the negative lens component $L_{22}$ in the second group, $f_{2a}$, $f_{2b}$ and $f_{2c}$ represent, in succession from the object side, the focal lengths of the negative, positive and negative lenses $L_{2a}$, $L_{2b}$ and $L_{2c}$ forming the cemented negative lens component $L_{21}$, $\nu_{2a}$, $\nu_{2b}$ and $\nu_{2c}$ represent the Abbe numbers of these lenses, $n_5$ and $n_6$ represent the refractive indices of the positive lens $L_{2b}$ and the rearward negative lens $L_{2c}$ forming the cemented negative lens component $L_{21}$, and $r_{10}$ and $r_{11}$ represent the object side and image side surfaces, respectively, of the negative lens component $L_{22}$.

By so providing the negative lens component $L_{21}$ comprising three negative, positive and negative lenses cemented together in the second group $G_2$ as the magnification changing group, good correction of the various aberrations with respect to a standard wavelength as well as chromatic aberration, particularly astigmatism and coma in a short focal length condition in the vicinity of y-line ($\lambda=435.8$ nm) which provides a wide angle of view has become possible. In the conventional four-group telephoto zoom lens, the various aberrations for the standard wavelength could be corrected to some degree but any fluctuation of chromatic aberration by zooming could not completely be corrected, whereas the present invention has succeeded in well balancing the various aberrations for the standard wavelength and the fluctuation of chromatic aberration resulting from zooming by constituting the negative lens component in the second group, i.e., the negative lens component adjacent to the object side, by three lenses cemented together. That is, it is known to provide a cemented surface for the correction of chromatic aberration, but in the telephoto zoom lens of this type, it is most effective to make the second group into the cemented construction as described above in order to well balance and correct the fluctuation of the aberrations for the standard wavelength and the fluctuation of chromatic aberration resulting from zooming, and this is not mere addition of a cemented surface. The addition of this cemented surface $r_7$ has earned the degree of freedom of aberration correction in the second group and therefore, in the next cemented surface $r_8$, the load for the correction of chromatic aberration has been reduced and the degree of freedom for the correction of coma and astigmatism for the standard wavelength could be produced. As a result, a zoom lens which maintains a good optical performance in the entire magnification change area and moreover from infinity to a short distance could be realized.

In this manner, by the construction of the second group according to the present invention, the performance in infinity photography as well as the optical performance in short distance photography has been greatly improved with a result that photography at shorter distances has become possible. More specifically, in the second group, the difference in refractive index for the standard wavelength has not been made so great but the difference in dispersion has been made great on the opposite sides of the first cemented surface $r_7$ formed by the negative lens $L_{2a}$ and the positive lens $L_{2b}$ while, on the other hand, the difference in refractive index for the standard wavelength has been made positively great on the opposite sides of the second cemented surface $r_8$ formed by the positive lens $L_{2b}$ and the negative lens $L_{2c}$. In the first cemented surface $r_7$, chromatic aberration has been corrected without so much aggravating the aberration fluctuation for the standard wavelength and the chromatic aberration correction in the second cemented surface $r_8$ has been made up for and the coma and astigmatism particularly on the short focal length side of g-line produced there have been corrected. Also, in the second cemented surface $r_8$, the negative curvature of image field chiefly in the long focal length condition is corrected and coma is reduced.

The foregoing conditions (1)-(5) are satisfactory to minimize, in such construction of the second group, the fluctuations of the various aberrations and chromatic aberration for the standard wavelength resulting from zooming.

Formula (1) prescribes the ratio of the focal lengths of the cemented negative lens $L_{21}$ and negative lens component $L_{22}$ forming the second group, and determines an appropriate distribution of the refractive powers to be borne by the two negative lens components. If the upper limit of this condition is exceeded, spherical aberration will become excessively negative on the long focal length side and astigmatism will also become excessively negative on the short focal length side. If the lower limit of this condition is exceeded, reverse conditions will occur and in either case, it will become difficult to well correct spherical aberration and astigmatism over the entire magnification change range by zooming.

Formula (2) prescribes the shape of the rearward negative lens component $L_{22}$ in the second group. If the upper limit of this condition is exceeded, spherical aberration and astigmatism will become excessively positive on the long focal length side while spherical aberration will become excessively negative on the short focal length side and excessive outward coma will occur. If the lower limit of this condition is exceeded, the reverse tendency will become pronounced and it will become difficult to well maintain the aberration balance over the entire magnification change range.

Formulas (3) and (4) are for balancing the correction of chromatic aberration while well correcting the fluctuation of various aberrations, particularly coma for the standard wavelength resulting from zooming. Formula (3) is concerned with the first cemented surface $r_7$ convex toward the object side which is formed by the negative lens $L_{2a}$ and the positive lens $L_{2b}$, and formula (4) is concerned with the second cemented surface $r_8$ convex toward the image side which is formed by the positive lens $L_{2b}$ and the negative lens $L_{2c}$. The first cemented surface $r_7$ which is convex toward the object side is advantageous for the correction of chromatic aberration while it is not so effective for the correction of coma, and the second cemented surface $r_8$ which is convex toward the image side is liable to create chromatic aberration while it is effective for the correction of coma. If the upper limits of formulas (3) and (4) are exceeded, the on-axis chromatic aberration will become excessively positive particularly on the long focal length side and lateral chromatic aberration will become excessively negative on the short focal length side, and both will be under-corrected as the second group having a negative refractive power. If the lower limits of these conditions are exceeded, the on-axis chromatic aberration will become excessively negative on the long focal length side and lateral chromatic aberration will become excessively positive on the short focal length side, and achromatization as the second group will become excessive.

In the third and fourth groups following the second group, the on-axis chromatic aberration and lateral chromatic aberration can be corrected only in the same direction and therefore, it is necessary to maintain an appropriate balance between the on-axis chromatic aberration and lateral chromatic aberration in the second group by conditions (3) and (4). If a chromatization is effected only by the second cemented surface r$_8$, chromatic astigmatism and chromatic coma on the short focal length side will occur, while if achromatization is effected only by the first cemented surface r$_7$, chromatic aberration may be corrected to some degree but it will become difficult to correct coma and curvature of image field for the standard wavelength particularly in the intermediate focal length to the long focal length condition. Therefore, as indicated by conditions (3) and (4), two first and second cemented surfaces are necessary in the second group.

Formula (5) prescribes the difference in refractive index for the standard wavelength on the opposite sides of the second cemented surface r$_8$ in the second group under the above-described conditions. If the upper limit of this condition is exceeded, spherical aberration will become excessively negative on the long focal length side and astigmatism will become excessive on the short focal length side. If the lower limit of this condition is exceeded, the reverse tendency will become pronounced and it will become difficult to maintain an excellent imaging performance over the entire magnification change range.

According to the present invention, in the above-described construction of the second group, it is desirable that the first group G$_1$ comprise, in succession from the object side, a cemented positive lens component L$_{11}$ consisting of a negative lens L$_{1a}$ and a positive lens L$_{1b}$ cemented together, and a positive lens L$_{12}$. The cemented surface of the cemented positive lens component L$_{11}$ is convex toward the object side and therefore, high order spherical aberration is liable to occur and this is disadvantageous for providing a bright lens, but is effective for the correction of chromatic aberration, particularly chromatic coma and chromatic astigmatism in the long focal length condition, and an improved performance at infinity even for short distance objects is contrived and therefore, a stable optical performance is maintained although deterioration of the performance is much higher than in the conventional lens.

Thus, it is desirable that the first group further satisfy the following conditions:

$$0.4 < \frac{f_{11}}{f_{12}} < 0.9 \quad (6)$$

$$0.2 < \frac{r_3 + r_1}{r_3 - r_1} < 1.0 \quad (7)$$

$$-0.03 < f_{11}\left(\frac{1}{f_{1a}\nu_{1a}} + \frac{1}{f_{1b}\nu_{1b}}\right) < 0 \quad (8)$$

where f$_{11}$ and f$_{12}$ represent the focal lengths of the cemented positive lens component L$_{11}$ and the positive lens component L$_{12}$, respectively, in the first group, r$_1$ and r$_3$ represent the radii of curvature of the object side and image side surfaces of the cemented positive lens component L$_{11}$, f$_{1a}$ and f$_{1b}$ represent the focal lengths of the negative lens L$_{1a}$ and the positive lens L$_{1b}$ forming the cemented surface, and $\nu_{1a}$ and $\nu_{1b}$ represent the Abbe numbers of these lenses.

These conditions (6)–(8) are appropriate for balancing the aberration fluctuation resulting from zooming, the correction of chromatic aberration on the long focal length side and further the variations in aberrations in infinity and shortest distance photography. If the upper limit of condition (6) is exceeded, spherical aberration for both infinity object and short distance object will become excessively positive on the long focal length side and astigmatism will become excessively negative, and this is undesirable. Particularly, the variation in spherical aberration on the long focal length side and astigmatism for infinity object will excessively move and it will become difficult to keep the balance outside these conditions. If the upper limit of condition (7) is exceeded, spherical aberration in both infinity and very short distance photography will become excessively negative on the long focal length side and astigmatism will become excessively positive on the short focal length side. The positions of the infinity and very short distance image planes will excessively fluctuate on the long focal length side and this is undesirable. If the upper limit of condition (8) is exceeded, the on-axis chromatic aberration will become excessively positive particularly on the long focal length side and the off-axis chromatic aberration will become excessively negative. If the upper limit of this condition is exceeded, excessive chromatic aberration will occur in a direction opposite to that when the lower limit is exceeded.

Some embodiments of the present invention will hereinafter be described by reference to the drawings. A first embodiment is a zoom lens for 35 mm still camera having a focal length of 80–195.2 mm and F-number of 4.0. As shown in the lens construction view of FIG. 1, the first group G$_1$ comprises, in succession from the object side, a positive lens component L$_{11}$ consisting of a negative meniscus lens L$_{1a}$ having its convex surface facing the object side and a bioconvex lens L$_{1b}$ having its convex surface of sharper curvature facing the object side, the lenses L$_{1a}$ and L$_{1b}$ being cemented together, and a positive meniscus lens component L$_{12}$ having its convex surface facing the object side. The second group G$_2$ comprises, in succession from the object side, a negative lens component L$_{21}$ consisting of a biconcave lens L$_{2a}$, a biconvex lens L$_{2b}$ and a biconcave lens L$_{2c}$ cemented together, and a biconcave lens component L$_{22}$. The third group G$_3$ comprises a positive lens component L$_3$ comprising, in succession from the object side, a biconvex lens L$_{3a}$ and a negative meniscus lens L$_{3b}$ having its concave surface facing the object side, the lenses L$_{3a}$ and L$_{3b}$ being cemented together. The fourth group G$_4$ comprises, in succession from the object side, a positive lens component L$_{41}$ having its convex surface of sharper curvature facing the object side, a biconcave negative lens component L$_{42}$, a negative meniscus lens component L$_{43}$ having a great air space with respect to the lens component L$_{42}$ and having its convex surface facing the object side, and a biconvex positive lens component L$_{44}$.

The various aberrations for an infinity object in the shortest focal length condition (f=80.0) and the longest focal length condition (f=195.2) of the first embodiment are illustrated in FIGS. 2 and 3, and the various aberrations for a short distance object in the shortest and the longest focal length condition are illustrated in FIGS. 4 and 5.

A second embodiment of the present invention is a zoom lens for 35 mm still camera having the same focal length and the same F-number as the first embodiment, and the lens construction thereof is substantially equal to the first embodiment shown in FIG. 1. The various aberrations for an infinity object in the shortest and the longest focal length condition of the second embodiment are illustrated in FIGS. 6 and 7, and the various aberrations for a short distance object in the shortest and the longest focal length condition are illustrated in FIGS. 8 and 9.

A third embodiment of the present invention is a zoom lens for 35 mm still camera having a focal length of 71.8–204.0 mm and F-number of 4.0, and has the lens construction as shown in FIG. 10. The present embodiment is basically the same as the aforedescribed first and second embodiments, but by adding a biconvex positive lens component $L_{43}$ to the fourth group $G_4$, it makes the zoom ratio greater and yet maintains the aperture of the last lens small while effecting better correction of coma and curvature of image field. The full length of the lens is very short. The various aberrations for an infinity object in the shortest focal length condition (f=71.8) and the longest focal length condition (f=204.0) of the present embodiment are illustrated in FIGS. 11 and 12, and the various aberrations for a short distance object in the shortest and the longest focal length condition are illustrated in FIGS. 13 and 14.

In the first to third embodiments, focusing is accomplished solely by movement of the first group, but during focusing, it is effective to move the second group as the magnification changing group with the first group. According to such focusing system, the photographing magnification for a short distance object can be made greater and the position in which the pincipal ray cuts the foremost lens surface can be made closer to the optical axis and thereby the lens aperture can be made smaller and further, deterioration of the aberrations at a short distance can be minimized.

Figure 15:
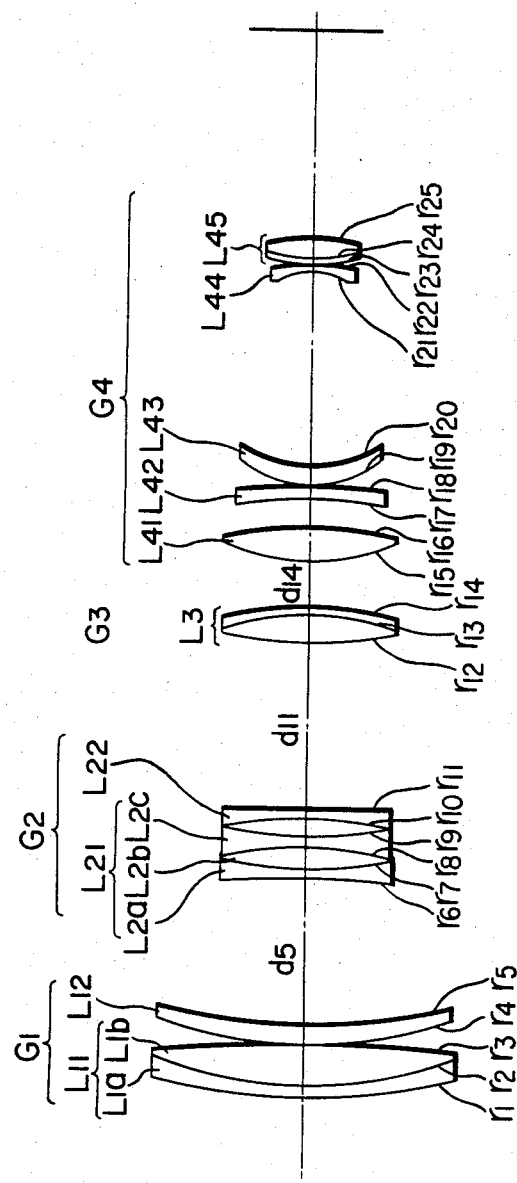
FIG. 15 shows the lens construction of a fourth embodiment.

A fourth embodiment of the present invention is a compact zoom lens of great aperture ratio and high performance having a focal length of 200–400 mm and F-number of 4.0. As shown in FIG. 15, the lens arrangement of the first group $G_1$ to the third group $G_3$ basically has a shape substantially similar to that of the first embodiment. This lens is small in zoom ratio but has a great aperture ratio. At the same time, a very short-shaped master lens is introduced into the fourth group $G_4$ and as a telephoto zoom lens, this lens is compact for its full length. The fourth group $G_4$ comprises, in succession from the object side, a biconvex positive lens component $L_{41}$, a negative meniscus lens component $L_{42}$ having its concave surface facing the object side, a positive meniscus lens component $L_{43}$ having its convex surface facing the object side, a negative meniscus lens component $L_{44}$ having its concave surface facing the object side, and a positive lens component $L_{45}$ consisting of a negative meniscus lens having its convex surface facing the object side and a biconvex positive lens, these two lenses being cemented together. FIG. 16 illustrates the various aberrations in the present embodiment when f=200 mm and in the infinity photography condition, and FIG. 17 illustrates the various aberrations when f=400 mm. FIG. 18 illustrates the aberrations when f=200 mm and $d_0$=2492.954 mm and magnification $\beta = -0.09$, and FIG. 19 illustrates the various aberrations when f=400 mm and $d_0$=2492.954 mm and $\beta = 0.18$.

The numerical data of each embodiment will be shown below. In the tables below, $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, $n_3$, . . . and $\nu_1$, $\nu_2$, $\nu_3$, . . . represent the refractive indices and Abbe numbers, respectively, of the respective lenses. Also, $d_0$ represents the distance from the foremost lens surface to the object, $B_f$ represents the back focal length, and $f_1$ and $f_2$ represent the focal lengths of the first group $G_1$ and the second group $G_2$, respectively.

| First Embodiment Focal length f = 80 ~ 195.2 F-number 4.0 | | | | | |
|---|---|---|---|---|---|
| $r_1 = 109.097$ | $d_1 = 1.7$ | $n_1 = 1.80518$ | $\nu_1 = 25.4$ | $L_{1a}$ ⎫ $L_{11}$ ⎫ | |
| $r_2 = 62.650$ | $d_2 = 8.1$ | $n_2 = 1.62041$ | $\nu_2 = 60.3$ | $L_{1b}$ ⎭ | |
| $r_3 = -716.000$ | $d_3 = 0.1$ | | | | $G_1$ |
| $r_4 = 134.056$ | $d_4 = 4.0$ | $n_3 = 1.51680$ | $\nu_3 = 64.1$ | $L_{12}$ ⎭ | |
| $r_5 = 603.844$ | $d_5 =$ variable | | | | |
| $r_6 = -300.000$ | $d_6 = 1.0$ | $n_4 = 1.78797$ | $\nu_4 = 47.5$ | $L_{2a}$ ⎫ | |
| $r_7 = 55.000$ | $d_7 = 6.1$ | $n_5 = 1.75520$ | $\nu_5 = 27.6$ | $L_{2b}$ ⎬ $L_{21}$ ⎫ | |
| $r_8 = -40.000$ | $d_8 = 0.9$ | $n_6 = 1.58144$ | $\nu_6 = 40.8$ | $L_{2c}$ ⎭ | $G_2$ |
| $r_9 = 56.331$ | $d_9 = 4.1$ | | | | |
| $r_{10} = -44.350$ | $d_{10} = 1.1$ | $n_7 = 1.58913$ | $\nu_7 = 61.2$ | $L_{22}$ ⎭ | |
| $r_{11} = 177.834$ | $d_{11} =$ variable | | | | |
| $r_{12} = 155.00$ | $d_{12} = 5.5$ | $n_8 = 1.62041$ | $\nu_8 = 60.3$ | $L_{3a}$ ⎫ $L_3$ ⎫ | $G_3$ |
| $r_{13} = -31.792$ | $d_{13} = 0.9$ | $n_9 = 1.75520$ | $\nu_9 = 27.6$ | $L_{3b}$ ⎭ | |
| $r_{14} = -68.917$ | $d_{14} =$ variable | | | | |
| $r_{15} = 41.667$ | $d_{15} = 5.3$ | $n_{10} = 1.67025$ | $\nu_{10} = 57.6$ | $L_{41}$ ⎫ | |
| $r_{16} = 217.900$ | $d_{16} = 2.0$ | | | | |
| $r_{17} = -692.473$ | $d_{17} = 2.0$ | $n_{11} = 1.79504$ | $\nu_{11} = 28.6$ | $L_{42}$ ⎬ | $G_4$ |
| $r_{18} = 299.735$ | $d_{18} = 53.4$ | | | | |
| $r_{19} = -23.344$ | $d_{19} = 2.4$ | $n_{12} = 1.79668$ | $\nu_{12} = 45.5$ | $L_{43}$ | |
| $r_{20} = -36.254$ | $d_{20} = 0.2$ | | | | |
| $r_{21} = 72.000$ | $d_{21} = 5.3$ | $n_{13} = 1.58267$ | $\nu_{13} = 46.5$ | $L_{44}$ ⎭ | |
| $r_{22} = -334.140$ | $B_f = 41.366$ | | | | |

| | F | | |
|---|---|---|---|
| $d_f$ | 80 | 145.465 | 195.201 |
| $d_5$ | 3.034 | 33.625 | 43.150 |
| $d_{11}$ | 30.972 | 14.148 | 1.366 |
| $d_{14}$ | 16.7208 | 2.948 | 6.198 |

Short distance photography Magnification $\beta$ when $d_0$=781.314

| $\beta$ | −0.1209 | −0.2198 | −0.2949 |

-continued $f_1 = 121.605$
$f_2 = -37.384$
$f_{11} = 188.934$
$f_{12} = 332.452$
$f_{21} = -107.875$
$f_{22} = -60.143$ $$f_{21}\left(\frac{1}{f_{2a}\nu_{2a}} + \frac{1}{f_{2b}\nu_{2b}}\right) = -0.0854$$

$$f_{21}\left(\frac{1}{f_{2b}\nu_{2b}} + \frac{1}{f_{2c}\nu_{2c}}\right) = -0.0580$$

$$f_{11}\left(\frac{1}{f_{1a}\nu_{1a}} + \frac{1}{f_{1b}\nu_{1b}}\right) = -0.00643$$

Short distance photography Magnification $\beta$ when $d_0 = 781.386$

| $\beta$ | $-0.1209$ | $-0.2198$ | $-0.2949$ |

$f_1 = 121.605$
$f_2 = -37.384$
$f_{11} = 189.120$
$f_{12} = 330.986$
$f_{21} = -100.005$
$f_{22} = -62.982$ $$f_{21}\left(\frac{1}{f_{2a}\nu_{2a}} + \frac{1}{f_{2b}\nu_{2b}}\right) = -0.0611$$

$$f_{21}\left(\frac{1}{f_{2b}\nu_{2b}} + \frac{1}{f_{2c}\nu_{2c}}\right) = -0.0559$$

| | Second Embodiment Focal Length f = 80 ~ 195.2  F-number 4.0 | | | | |
|---|---|---|---|---|---|
| $r_1 = 107.500$ | $d_1 = 1.7$ | $n_1 = 1.80518$ | $\nu_1 = 25.4$ | $L_{1a}$ | |
| $r_2 = 59.000$ | $d_2 = 8.1$ | $n_2 = 1.63854$ | $\nu_2 = 55.5$ | $L_{1b}$ | $L_{11}$ |
| $r_3 = -1028.518$ | $d_3 = 0.1216$ | | | | $G_1$ |
| $r_4 = 145.000$ | $d_4 = 4.0$ | $n_3 = 1.51680$ | $\nu_3 = 64.1$ | $L_{12}$ | |
| $r_5 = 943.041$ | $d_5 = $ variable | | | | |
| $r_6 = -300.000$ | $d_6 = 1.0$ | $n_4 = 1.80218$ | $\nu_4 = 44.7$ | $L_{2a}$ | |
| $r_7 = 59.000$ | $d_7 = 6.1$ | $n_5 = 1.75692$ | $\nu_5 = 31.7$ | $L_{2b}$ | $L_{21}$ |
| $r_8 = -40.000$ | $d_8 = 0.9$ | $n_6 = 1.58913$ | $\nu_6 = 61.2$ | $L_{2c}$ | $G_2$ |
| $r_9 = 55.214$ | $d_9 = 4.1$ | | | | |
| $r_{10} = -43.300$ | $d_{10} = 1.1$ | $n_7 = 1.58913$ | $\nu_7 = 61.2$ | $L_{22}$ | |
| $r_{11} = 261.765$ | $d_{11} = $ variable | | | | |
| $r_{12} = 169.000$ | $d_{12} = 5.5$ | $n_8 = 1.60311$ | $\nu_8 = 60.7$ | $L_{3a}$ | |
| | | | | | $L_3$  $G_3$ |
| $r_{13} = -31.400$ | $d_{13} = 0.9$ | $n_9 = 1.75520$ | $\nu_9 = 27.6$ | $L_{3b}$ | |
| $r_{14} = -63.009$ | $d_{14} = $ variable | | | | |
| $r_{15} = 33.300$ | $d_{15} = 5.3$ | $n_{10} = 1.51009$ | $\nu_{10} = 63.4$ | $L_{41}$ | |
| $r_{16} = 439.080$ | $d_{16} = 3.0$ | | | | |
| $r_{17} = -142.500$ | $d_{17} = 2.0$ | $n_{11} = 1.79504$ | $\nu_{11} = 28.6$ | $L_{42}$ | $G_4$ |
| $r_{18} = -564.561$ | $d_{18} = 46.5$ | | | | |
| $r_{19} = -20.300$ | $d_{19} = 2.4$ | $n_{12} = 1.71300$ | $\nu_{12} = 54.0$ | $L_{43}$ | |
| $r_{20} = -31.167$ | $d_{20} = 0.2$ | | | | |
| $r_{21} = 57.000$ | $d_{21} = 5.3$ | $n_{13} = 1.54072$ | $\nu_{13} = 47.2$ | $L_{44}$ | |
| $r_{22} = 349.164$ | $B_f = 42.743$ | | | | |

| | f | | |
|---|---|---|---|
| $d_i$ | 80.000 | 145.465 | 195.201 |
| $d_5$ | 3.183 | 33.774 | 43.299 |
| $d_{11}$ | 30.583 | 13.759 | 0.977 |
| $d_{14}$ | 16.385 | 2.617 | 5.874 |

$$f_{11}\left(\frac{1}{f_{1a}\nu_{1a}} + \frac{1}{f_{1b}\nu_{1b}}\right) = -0.00625$$

| | Third Embodiment Focal length f = 71.8 ~ 204.0  F-number 4.0 | | | | |
|---|---|---|---|---|---|
| $r_1 = 93.500$ | $d_1 = 1.6$ | $n_1 = 1.80518$ | $\nu_1 = 25.4$ | $L_{1a}$ | |
| | | | | | $L_{11}$ |
| $r_2 = 65.000$ | $d_2 = 9.5$ | $n_2 = 1.44679$ | $\nu_2 = 90.8$ | $L_{1b}$ | |
| $r_3 = -239.120$ | $d_3 = 0.1$ | | | | $G_1$ |
| $r_4 = 86.988$ | $d_4 = 4.5$ | $n_3 = 1.46450$ | $\nu_3 = 65.8$ | $L_{12}$ | |
| $r_5 = 287.046$ | $d_5 = $ variable | | | | |
| $r_6 = -264.850$ | $d_6 = 0.9$ | $n_4 = 1.78797$ | $\nu_4 = 47.5$ | $L_{2a}$ | |
| $r_7 = 46.800$ | $d_7 = 6.5$ | $n_5 = 1.75692$ | $\nu_5 = 31.7$ | $L_{2b}$ | $L_{21}$ |
| $r_8 = -40.029$ | $d_8 = 0.9$ | $n_6 = 1.58913$ | $\nu_6 = 61.2$ | $L_{2c}$ | $G_2$ |
| $r_9 = 43.150$ | $d_9 = 4.8$ | | | | |
| $r_{10} = -40.000$ | $d_{10} = 1.0$ | $n_7 = 1.65160$ | $\nu_7 = 58.5$ | $L_{22}$ | |
| $r_{11} = -1435.334$ | $d_{11} = $ variable | | | | |
| $r_{12} = 130.000$ | $d_{12} = 5.5$ | $n_8 = 1.56384$ | $\nu_8 = 60.8$ | $L_{3a}$ | |
| | | | | | $L_3$  $G_3$ |
| $r_{13} = -28.800$ | $d_{13} = 0.9$ | $n_9 = 1.80518$ | $\nu_9 = 25.4$ | $L_{3b}$ | |
| $r_{14} = -51.115$ | $d_{14} = $ variable | | | | |
| $r_{15} = 33.600$ | $d_{15} = 5.1$ | $n_{10} = 1.62041$ | $\nu_{10} = 60.4$ | $L_{41}$ | |

-continued

| | | | | |
|---|---|---|---|---|
| $r_{16} = 120.000$ | $d_{16} = 4.0$ | | | |
| $r_{17} = -249.756$ | $d_{17} = 2.0$ | $n_{11} = 1.79504$ $\nu_{11} = 28.6$ | $L_{42}$ | |
| $r_{18} = -6606.577$ | $d_{18} = 36.5$ | | | $G_4$ |
| $r_{19} = 118.300$ | $d_{19} = 3.0$ | $n_{12} = 1.51454$ $\nu_{12} = 54.6$ | $L_{43}$ | |
| $r_{20} = -189.871$ | $d_{20} = 4.0$ | | | |
| $r_{21} = -23.200$ | $d_{21} = 2.3$ | $n_{13} = 1.80411$ $\nu_{13} = 46.4$ | $L_{44}$ | |
| $r_{22} = -61.320$ | $d_{22} = 0.1$ | | | |
| $r_{23} = 58.000$ | $d_{23} = 4.0$ | $n_{14} = 1.60342$ $\nu_{14} = 38.1$ | $L_{45}$ | |
| $r_{24} = 455.664$ | $B_f = 40.035$ | | | |

| | f | | |
|---|---|---|---|
| $d_i$ | 71.800 | 145.000 | 204.000 |
| $d_5$ | 2.418 | 36.218 | 45.806 |
| $d_{11}$ | 30.615 | 14.033 | 0.668 |
| $d_{14}$ | 20.115 | 2.897 | 6.674 |

Short distance photography Magnification $\beta$ when $d_0 = 1002.049$

| $\beta$ | -0.0807 | -0.1630 | -0.2293 |
|---|---|---|---|

$f_1 = 116.000$
$f_2 = -33.000$
$f_{11} = 201.791$
$f_{12} = 266.798$
$f_{21} = -75.541$
$f_{22} = -63.165$ $$f_{21}\left(\frac{1}{f_{2a}\nu_{2a}} + \frac{1}{f_{2b}\nu_{2b}}\right) = -0.0494$$

$$f_{21}\left(\frac{1}{f_{2b}\nu_{2b}} + \frac{1}{f_{2c}\nu_{2c}}\right) = -0.0458$$

-continued $$f_{11}\left(\frac{1}{f_{1a}\nu_{1a}} + \frac{1}{f_{1b}\nu_{1b}}\right) = -0.0100$$

Fourth Embodiment
Focal length $f = 200 \sim 400$   F-number 4.0

| | | | | |
|---|---|---|---|---|
| $r_1 = 239.867$ | $d_1 = 3.3$ | $n_1 = 1.75692$ $\nu_1 = 31.7$ $L_{1a}$ | $L_{11}$ | |
| $r_2 = 140.839$ | $d_2 = 14.0$ | $n_2 = 1.49782$ $\nu_2 = 82.3$ $L_{1b}$ | | $G_1$ |
| $r_3 = -430.000$ | $d_3 = 0.2$ | | | |
| $r_4 = 155.000$ | $d_4 = 7.0$ | $n_3 = 1.49782$ $\nu_3 = 82.3$ | $L_{12}$ | |
| $r_5 = 240.871$ | $d_5 =$ Variable | | | |
| $r_6 = -366.200$ | $d_6 = 2.5$ | $n_4 = 1.78797$ $\nu_4 = 47.5$ $L_{2a}$ | | |
| $r_7 = 143.200$ | $d_7 = 8.0$ | $n_5 = 1.75520$ $\nu_5 = 27.6$ $L_{2b}$ | $L_{21}$ | |
| $r_8 = -110.916$ | $d_8 = 2.2$ | $n_6 = 1.51680$ $\nu_6 = 64.1$ $L_{2c}$ | | $G_2$ |
| $r_9 = 100.127$ | $d_9 = 7.5$ | | | |
| $r_{10} = -117.970$ | $d_{10} = 2.5$ | $n_7 = 1.80218$ $\nu_7 = 44.7$ | $L_{22}$ | |
| $r_{11} = -5626.023$ | $d_{11} =$ Variable | | | |
| $r_{12} = 184.117$ | $d_{12} = 10.0$ | $n_8 = 1.49782$ $\nu_8 = 82.3$ $L_{3a}$ | | |
| $r_{13} = -68.320$ | $d_{13} = 1.9$ | $n_9 = 1.75692$ $\nu_9 = 31.7$ $L_{3b}$ | $L_3$ | $G_3$ |
| $r_{14} = -123.60$ | $d_{14} =$ Variable | | | |
| $r_{15} = 70.180$ | $d_{15} = 11.0$ | $n_{10} = 1.49782$ $\nu_{10} = 82.3$ | $L_{41}$ | |
| $r_{16} = -130.821$ | $d_{16} = 10.0$ | | | |
| $r_{17} = -96.159$ | $d_{17} = 3.0$ | $n_{11} = 1.78797$ $\nu_{11} = 47.5$ | $L_{42}$ | |
| $r_{18} = -900.350$ | $d_{18} = 0.6$ | | | |
| $r_{19} = 37.000$ | $d_{19} = 6.5$ | $n_{12} = 1.51680$ $\nu_{12} = 64.1$ | $L_{43}$ | $G_4$ |
| $r_{20} = 41.623$ | $d_{20} = 66.0$ | | | |
| $r_{21} = -26.710$ | $d_{21} = 2.5$ | $n_{13} = 1.77279$ $\nu_{13} = 49.4$ | $L_{44}$ | |
| $r_{22} = -81.538$ | $d_{22} = 0.1$ | | | |
| $r_{23} = 168.000$ | $d_{23} = 2.0$ | $n_{14} = 1.73350$ $\nu_{14} = 51.1$ $L_{4a}$ | | |
| $r_{24} = 72.000$ | $d_{24} = 6.5$ | $n_{15} = 1.58144$ $\nu_{15} = 40.8$ $L_{4b}$ | $L_{45}$ | |
| $r_{25} = -55.442$ | $B_f = 69.8277$ | | | |

| | f | | |
|---|---|---|---|
| $d_i$ | 200 | 300 | 400 |
| $d_5$ | 50.635 | 91.056 | 111.267 |
| $d_{11}$ | 56.297 | 29.726 | 3.155 |
| $d_{14}$ | 15.464 | 1.614 | 7.975 |

Short distance photography $d_0 = 2492.954$

| $\beta$ | -0.09 | -0.0135 | -0.18 |
|---|---|---|---|

$f_1 = 274.652$
$f_2 = -80.276$
$f_{11} = 405.96$
$f_{12} = 850.33$
$f_{21} = -183.938$
$f_{22} = -150.242$ $$f_{21}\left(\frac{1}{f_{2a}\nu_{2a}} + \frac{1}{f_{2b}\nu_{2b}}\right) = -0.0497$$

-continued $$f_{21}\left(\frac{1}{f_{2b}\nu_{2b}} + \frac{1}{f_{2c}\nu_{2c}}\right) = -0.0512$$

$$f_{11}\left(\frac{1}{f_{1a}\nu_{1a}} + \frac{1}{f_{1b}\nu_{1b}}\right) = -0.0051$$

As seen from the aberration graphs, in any of these embodiments, an excellent imaging performance is maintained even by the magnification change by zooming and a sufficient imaging performance is had even for objects at considerably short distances. Accordingly, it is apparent that the construction of the zoom lens according to the present invention is very effective for an infinity object as well as a short distance object.

I claim:

1. A four-group zoom lens including, in succession from the object side, a first group ($G_1$) having a positive refractive power and movable on the optical axis for focusing, a second group ($G_2$) having a negative refractive power and movable on the optical axis to vary the total focal length of the entire system, a third group ($G_3$) having a positive refractive power and movable on the optical axis to keep the image plane at a predetermined position, and a fourth group ($G_4$) as a relay lens system having a positive refractive power, said second group ($G_2$) having a cemented lens component ($L_{21}$) comprising three negative, positive and negative lenses ($L_{2a}$, $L_{2b}$, $L_{2c}$) cemented together and having a composite negative refractive power, and a negative lens component ($L_{22}$), and in which said zoom lens satisfies the following conditions:

$$1.0 < \frac{f_{21}}{f_{22}} < 1.9 \quad (1)$$

$$0.5 < \frac{r_{11} + r_{10}}{r_{11} - r_{10}} < 1.2 \quad (2)$$

$$-0.1 < f_{21}\left(\frac{1}{f_{2a}\nu_{2a}} + \frac{1}{f_{2b}\nu_{2b}}\right) < -0.03 \quad (3)$$

$$-0.07 < f_{21}\left(\frac{1}{f_{2b}\nu_{2b}} + \frac{1}{f_{2c}\nu_{2c}}\right) < -0.03 \quad (4)$$

$$0.1 < n_5 - n_6 < 0.3 \quad (5)$$

where $f_{21}$ and $f_{22}$ are the focal lengths of the cemented negative lens component ($L_{21}$) and negative lens component ($L_{22}$) in said second group, $f_{2a}$, $f_{2b}$ and $f_{2c}$ are the focal lengths of the negative, positive and negative lenses ($L_{2a}$, $L_{2b}$, $L_{2c}$) forming said cemented negative lens component ($L_{21}$), $\nu_{2a}$, $\nu_{2b}$ and $\nu_{2c}$ are the Abbe numbers of these lenses, $n_5$ and $n_6$ are the refractive indices of the positive lens ($L_{2b}$) and rearward negative lens ($L_{2c}$) forming said cemented negative lens component ($L_{21}$), and $r_{10}$ and $r_{11}$ represent the object side and image side surfaces of said negative lens component ($L_{22}$).

2. A four-group zoom lens according to claim 1, wherein said first group ($G_1$) has, in succession from the object side, a positive lens component ($L_{11}$) comprising a negative lens ($L_{1a}$) and a positive lens ($L_{1b}$) cemented together, and a positive lens component ($L_{12}$).

3. A four-group zoom lens according to claim 2, which satisfies the following conditions:

$$0.4 < \frac{f_{11}}{f_{12}} < 0.9 \quad (6)$$

$$0.2 < \frac{r_3 + r_1}{r_3 - r_1} < 1.0 \quad (7)$$

$$-0.03 < f_{11}\left(\frac{1}{f_{1a}\nu_{1a}} + \frac{1}{f_{1b}\nu_{1b}}\right) < 0 \quad (8)$$

where $f_{11}$ and $f_{12}$ are the focal lengths of the cemented positive lens component ($L_{11}$) and positive lens component ($L_{12}$) in said first group $r_1$ and $r_3$ are the radii of curvature of the object side and image side surfaces of said cemented positive lens component ($L_{11}$), $f_{1a}$ and $f_{1b}$ are the focal lengths of the negative lens ($L_{1a}$) and positive lens ($L_{1b}$) forming the cemented surface, and $\nu_{1a}$ and $\nu_{1b}$ are the Abbe numbers of said lenses ($L_{1a}$, $L_{1b}$).

4. A four-group zoom lens according to claim 3, wherein said fourth group ($G_4$) includes, in succession from the object side, a positive lens component having its surface of sharper curvature facing the object side, a negative lens component, a negative meniscus lens component having its concave surface facing the object side, and a positive lens component.

5. A four-group zoom lens according to claim 4, wherein numerical data are as follows:

| | Focal length f = 80 ~ 195.2 | F-number 4.0 | | | |
|---|---|---|---|---|---|
| $r_1 = 109.097$ | $d_1 = 1.7$ | $n_1 = 1.80518$ | $\nu_1 = 25.4$ | $L_{1a}$ | |
| $r_2 = 62.650$ | $d_2 = 8.1$ | $n_2 = 1.62041$ | $\nu_2 = 60.3$ | $L_{1b}$ } $L_{11}$ | |
| $r_3 = -716.000$ | $d_3 = 0.1$ | | | | } $G_1$ |
| $r_4 = 134.056$ | $d_4 = 4.0$ | $n_3 = 1.51680$ | $\nu_5 = 64.1$ | $L_{12}$ | |
| $r_5 = 603.844$ | $d_5 =$ variable | | | | |
| $r_6 = -300.000$ | $d_6 = 1.0$ | $n_4 = 1.78797$ | $\nu_4 = 47.5$ | $L_{2a}$ | |
| $r_7 = 55.000$ | $d_7 = 6.1$ | $n_5 = 1.75520$ | $\nu_5 = 27.6$ | $L_{2b}$ } $L_{21}$ | |
| $r_8 = -40.000$ | $d_8 = 0.9$ | $n_6 = 1.58144$ | $\nu_6 = 40.8$ | $L_{2c}$ | } $G_2$ |
| $r_9 = 56.331$ | $d_9 = 4.1$ | | | | |
| $r_{10} = -44.350$ | $d_{10} = 1.1$ | $n_7 = 1.58913$ | $\nu_7 = 61.2$ | $L_{22}$ | |
| $r_{11} = 177.834$ | $d_{11} =$ variable | | | | |
| $r_{12} = 155.00$ | $d_{12} = 5.5$ | $n_8 = 1.62041$ | $\nu_8 = 60.3$ | $L_{3a}$ } $L_3$ | $G_3$ |
| $r_{13} = -31.792$ | $d_{13} = 0.9$ | $n_9 = 1.75520$ | $\nu_9 = 27.6$ | $L_{3b}$ | |
| $r_{14} = -68.917$ | $d_{14} =$ variable | | | | |
| $r_{15} = 41.667$ | $d_{15} = 5.3$ | $n_{10} = 1.67025$ | $\nu_{10} = 57.6$ | $L_{41}$ | |
| $r_{16} = 217.900$ | $d_{16} = 2.0$ | | | | |
| $r_{17} = -692.473$ | $d_{17} = 2.0$ | $n_{11} = 1.79504$ | $\nu_{11} = 28.6$ | $L_{42}$ | |

-continued

| | | | | |
|---|---|---|---|---|
| $r_{18} = 299.735$ | $d_{18} = 53.4$ | | | G$_4$ |
| $r_{19} = -23.344$ | $d_{19} = 2.4$ | $n_{12} = 1.79668$  $\nu_{12} = 45.5$ | L$_{43}$ | |
| $r_{20} = -36.254$ | $d_{20} = 0.2$ | | | |
| $r_{21} = 72.000$ | $d_{21} = 5.3$ | $n_{13} = 1.58267$  $\nu_{13} = 46.5$ | L$_{44}$ | |
| $r_{22} = -334.140$ | $B_f = 41.366$ | | | |

| | F | | |
|---|---|---|---|
| $d_f$ | 80 | 145.465 | 195.201 |
| $d_5$ | 3.034 | 33.625 | 43.150 |
| $d_{11}$ | 30.972 | 14.148 | 1.366 |
| $d_{14}$ | 16.7208 | 2.948 | 6.198 |

Short distance photography Magnification $\beta$ when $d_0 = 781.314$

| $\beta$ | $-0.1209$ | $-0.2198$ | $-0.2949$ |
|---|---|---|---| back focal length, and $f_1$ and $f_2$ represent the focal lengths of the first group (G$_1$) and the second group (G$_2$), respectively.

6. A four-grup zoom lens according to claim 4, wherein numerical data are as follows:

Focal Length f = 80 ~ 195.2   F-number 4.0

| | | | | |
|---|---|---|---|---|
| $r_1 = 107.500$ | $d_1 = 1.7$ | $n_1 = 1.80518$  $\nu_1 = 25.4$ L$_{1a}$ | L$_{11}$ | |
| $r_2 = 59.000$ | $d_2 = 8.1$ | $n_2 = 1.63854$  $\nu_2 = 55.5$ L$_{1b}$ | | G$_1$ |
| $r_3 = -1028.518$ | $d_3 = 0.1216$ | | | |
| $r_4 = 145.000$ | $d_4 = 4.0$ | $n_3 = 1.51680$  $\nu_3 = 64.1$ | L$_{12}$ | |
| $r_5 = 943.041$ | $d_5 =$ variable | | | |
| $r_6 = -300.000$ | $d_6 = 1.0$ | $n_4 = 1.80218$  $\nu_4 = 44.7$ L$_{2a}$ | L$_{21}$ | |
| $r_7 = 59.000$ | $d_7 = 6.1$ | $n_5 = 1.75692$  $\nu_5 = 31.7$ L$_{2b}$ | | |
| $r_8 = -40.000$ | $d_8 = 0.9$ | $n_6 = 1.58913$  $\nu_6 = 61.2$ L$_{2c}$ | | G$_2$ |
| $r_9 = 55.214$ | $d_9 = 4.1$ | | | |
| $r_{10} = -43.300$ | $d_{10} = 1.1$ | $n_7 = 1.58913$  $\nu_7 = 61.2$ | L$_{22}$ | |
| $r_{11} = 261.765$ | $d_{11} =$ variable | | | |
| $r_{12} = 169.000$ | $d_{12} = 5.5$ | $n_8 = 1.60311$  $\nu_8 = 60.7$ L$_{3a}$ | L$_3$ | G$_3$ |
| $r_{13} = -31.400$ | $d_{13} = 0.9$ | $n_9 = 1.75520$  $\nu_9 = 27.6$ L$_{3b}$ | | |
| $r_{14} = -63.009$ | $d_{14} =$ variable | | | |
| $r_{15} = 33.300$ | $d_{15} = 5.3$ | $n_{10} = 1.51009$  $\nu_{10} = 63.4$ | L$_{41}$ | |
| $r_{16} = 439.080$ | $d_{16} = 3.0$ | | | |
| $r_{17} = -142.500$ | $d_{17} = 2.0$ | $n_{11} = 1.79504$  $\nu_{11} = 28.6$ | L$_{42}$ | G$_4$ |
| $r_{18} = -564.561$ | $d_{18} = 46.5$ | | | |
| $r_{19} = -20.300$ | $d_{19} = 2.4$ | $n_{12} = 1.71300$  $\nu_{12} = 54.0$ | L$_{43}$ | |
| $r_{20} = -31.167$ | $d_{20} = 0.2$ | | | |
| $r_{21} = 57.000$ | $d_{21} = 5.3$ | $n_{13} = 1.54072$  $\nu_{13} = 47.2$ | L$_{44}$ | |
| $r_{22} = 349.164$ | $B_f = 42.743$ | | | |

| | f | | |
|---|---|---|---|
| $d_f$ | 80.000 | 145.465 | 195.201 |
| $d_5$ | 3.183 | 33.774 | 43.299 |
| $d_{11}$ | 30.583 | 13.759 | 0.977 |
| $d_{14}$ | 16.385 | 2.617 | 5.874 |

$f_1 = 121.605$
$f_2 = -37.384$
$f_{11} = 188.934$
$f_{12} = 332.452$
$f_{21} = -107.875$
$f_{22} = -60.143$ $$f_{21}\left(\frac{1}{f_{2a}\nu_{2a}} + \frac{1}{f_{2b}\nu_{2b}}\right) = -0.0854$$

$$f_{21}\left(\frac{1}{f_{2b}\nu_{2b}} + \frac{1}{f_{2c}\nu_{2c}}\right) = -0.0580$$

$$f_{11}\left(\frac{1}{f_{1a}\nu_{1a}} + \frac{1}{f_{1b}\nu_{1b}}\right) = -0.00643$$

where $r_1, r_2, r_3 \ldots$ represent the radii of curvature of the successive lens surfaces from the object side, $d_1, d_2, d_3$, ... represent the center thicknesses and air spaces of the respective lenses, $n_1, n_2, n_3, \ldots$ and $\nu_1, \nu_2, \nu_3$ represent the refractive indices and Abbe numbers, respectively, of the respective lenses, $d_0$ represents the distance from the foremost lens surface to the object, $B_f$ represents the Short distance photography Magnification $\beta$ when $d_0 = 781.386$

| $\beta$ | $-0.1209$ | $-0.2198$ | $-0.2949$ |
|---|---|---|---|

$f_1 = 121.605$
$f_2 = -37.384$
$f_{11} = 189.120$
$f_{12} = 330.986$
$f_{21} = -100.005$
$f_{22} = -62.982$ $$f_{21}\left(\frac{1}{f_{2a}\nu_{2a}} + \frac{1}{f_{2b}\nu_{2b}}\right) = -0.0611$$

$$f_{21}\left(\frac{1}{f_{2b}\nu_{2b}} + \frac{1}{f_{2c}\nu_{2c}}\right) = -0.0559$$

$$f_{11}\left(\frac{1}{f_{1a}\nu_{1a}} + \frac{1}{f_{1b}\nu_{1b}}\right) = -0.00625$$

where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, n_3, \ldots$ and $\nu_1, \nu_2, \nu_3, \ldots$ represent the refractive indices and Abbe numbers, respectively, of the respective lenses, $d_0$ represents the distance from the foremost lens surface to the object, $B_f$ represents the back focal length, and $f_1$ and $f_2$ represent the focal lengths of the first group ($G_1$) and the second group ($G_2$), respectively.

7. A four-group zoom lens according to claim 3, wherein said fourth grup ($G_4$) includes, in succession from the object side, a positive lens component having its surface of sharper curvature facing the object side, a negative lens component, a biconvex positive lens component, a negative meniscus lens component having its concave surface facing the object side, and a positive lens component.

8. A four-group zoom lens according to claim 7, wherein numerical data are as follows:

-continued $$f_{21}\left(\frac{1}{f_{2a}\nu_{2a}} + \frac{1}{f_{2b}\nu_{2b}}\right) = -0.0494$$

$$f_{21}\left(\frac{1}{f_{2b}\nu_{2b}} + \frac{1}{f_{2c}\nu_{2c}}\right) = -0.0458$$

$$f_{11}\left(\frac{1}{f_{1a}\nu_{1a}} + \frac{1}{f_{1b}\nu_{1b}}\right) = -0.0100$$

where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, n_3, \ldots$ and $\nu_1, \nu_2, \nu_3, \ldots$ represent the refractive indices and Abbe numbers, respectively, of the respective lenses, $d_0$ represents the distance from the foremost lens surface to the object, $B_f$ represents the back focal length, and $f_1$ and $f_2$ represent

| Focal length f = 71.8 ~ 204.0 F-number 4.0 | | | | |
|---|---|---|---|---|
| $r_1 = 93.500$ | $d_1 = 1.6$ | $n_1 = 1.80518$ | $\nu_1 = 25.4$ $L_{1a}$ | $L_{11}$ $G_1$ |
| $r_2 = 65.000$ | $d_2 = 9.5$ | $n_2 = 1.44679$ | $\nu_2 = 90.8$ $L_{1b}$ | |
| $r_3 = -239.120$ | $d_3 = 0.1$ | | | |
| $r_4 = 86.988$ | $d_4 = 4.5$ | $n_3 = 1.46450$ | $\nu_3 = 65.8$ | $L_{12}$ |
| $r_5 = 287.046$ | $d_5 = $ variable | | | |
| $r_6 = -264.850$ | $d_6 = 0.9$ | $n_4 = 1.78797$ | $\nu_4 = 47.5$ $L_{2a}$ | $L_{21}$ $G_2$ |
| $r_7 = 46.800$ | $d_7 = 6.5$ | $n_5 = 1.75692$ | $\nu_5 = 31.7$ $L_{2b}$ | |
| $r_8 = -40.029$ | $d_8 = 0.9$ | $n_6 = 1.58913$ | $\nu_6 = 61.2$ $L_{2c}$ | |
| $r_9 = 43.150$ | $d_9 = 4.8$ | | | |
| $r_{10} = -40.000$ | $d_{10} = 1.0$ | $n_7 = 1.65160$ | $\nu_7 = 58.5$ | $L_{22}$ |
| $r_{11} = -1435.334$ | $d_{11} = $ variable | | | |
| $r_{12} = 130.000$ | $d_{12} = 5.5$ | $n_8 = 1.56384$ | $\nu_8 = 60.8$ $L_{3a}$ | $L_3$ $G_3$ |
| $r_{13} = -28.800$ | $d_{13} = 0.9$ | $n_9 = 1.80518$ | $\nu_9 = 25.4$ $L_{3b}$ | |
| $r_{14} = -51.115$ | $d_{14} = $ variable | | | |
| $r_{15} = 33.600$ | $d_{15} = 5.1$ | $n_{10} = 1.62041$ | $\nu_{10} = 60.4$ | $L_{41}$ |
| $r_{16} = 120.000$ | $d_{16} = 4.0$ | | | |
| $r_{17} = -249.756$ | $d_{17} = 2.0$ | $n_{11} = 1.79504$ | $\nu_{11} = 28.6$ | $L_{42}$ |
| $r_{18} = -6606.577$ | $d_{18} = 36.5$ | | | |
| $r_{19} = 118.300$ | $d_{19} = 3.0$ | $n_{12} = 1.51454$ | $\nu_{12} = 54.6$ | $L_{43}$ $G_4$ |
| $r_{20} = -189.871$ | $d_{20} = 4.0$ | | | |
| $r_{21} = -23.200$ | $d_{21} = 2.3$ | $n_{13} = 1.80411$ | $\nu_{13} = 46.4$ | $L_{44}$ |
| $r_{22} = -61.320$ | $d_{22} = 0.1$ | | | |
| $r_{23} = 58.000$ | $d_{23} = 4.0$ | $n_{14} = 1.60342$ | $\nu_{14} = 38.1$ | $L_{45}$ |
| $r_{24} = 455.664$ | $B_f = 40.035$ | | | |

| | f | | |
|---|---|---|---|
| $d_f$ | 71.800 | 145.000 | 204.000 |
| $d_5$ | 2.418 | 36.218 | 45.806 |
| $d_{11}$ | 30.615 | 14.033 | 0.668 |
| $d_{14}$ | 20.115 | 2.897 | 6.674 |

Short distance photography Magnification $\beta$ when $d_0 = 1002.049$

| $\beta$ | $-0.0807$ | $-0.1630$ | $-0.2293$ |

$f_1 = 116.000$
$f_2 = -33.000$
$f_{11} = 201.791$
$f_{12} = 266.798$
$f_{21} = -75.541$
$f_{22} = -63.165$ the focal lengths of the first group ($G_1$) and the second group ($G_2$), respectively.

9. A four-group zoom lens according to claim 3, wherein said fourth group ($G_4$) includes, in succession from the object side, a positive lens component having its convex surface of sharper curvature facing the object side, a negative lens component, a positive meniscus lens component having its convex surface facing the object side, a negative meniscus lens component having its concave surface facing the object side, and a biconvex positive lens compoent.

10. A four-group zoom lens according to claim 9, wherein numerical data are as follows:

| Focal length f = 200 ~ 400 F-number 4.0 | | | |
|---|---|---|---|
| $r_1 = 239.867$ | $d_1 = 3.3$ | $n_1 = 1.75692$ $\nu_1 = 31.7$ $L_{1a}$ | $L_{11}$ |

-continued

| | | | | |
|---|---|---|---|---|
| $r_2 = 140.839$ | $d_2 = 14.0$ | $n_2 = 1.49782$ | $\nu_2 = 82.3$ $L_{1b}$ | |
| $r_3 = -430.000$ | $d_3 = 0.2$ | | | $G_1$ |
| $r_4 = 155.000$ | $d_4 = 7.0$ | $n_3 = 1.49782$ | $\nu_3 = 82.3$ $L_{12}$ | |
| $r_5 = 240.871$ | $d_5 =$ Variable | | | |
| $r_6 = -366.200$ | $d_6 = 2.5$ | $n_4 = 1.78797$ | $\nu_4 = 47.5$ $L_{2a}$ | |
| $r_7 = 143.200$ | $d_7 = 8.0$ | $n_5 = 1.75520$ | $\nu_5 = 27.6$ $L_{2b}$ $L_{21}$ | |
| $r_8 = -110.916$ | $d_8 = 2.2$ | $n_6 = 1.51680$ | $\nu_6 = 64.1$ $L_{2c}$ | $G_2$ |
| $r_9 = 100.127$ | $d_9 = 7.5$ | | | |
| $r_{10} = -117.970$ | $d_{10} = 2.5$ | $n_7 = 1.80218$ | $\nu_7 = 44.7$ $L_{22}$ | |
| $r_{11} = -5626.023$ | $d_{11} =$ Variable | | | |
| $r_{12} = 184.117$ | $d_{12} = 10.0$ | $n_8 = 1.49782$ | $\nu_8 = 82.3$ $L_{3a}$ $L_3$ | $G_3$ |
| $r_{13} = -68.320$ | $d_{13} = 1.9$ | $n_9 = 1.75692$ | $\nu_9 = 31.7$ $L_{3b}$ | |
| $r_{14} = -123.60$ | $d_{14} =$ Variable | | | |
| $r_{15} = 70.180$ | $d_{15} = 11.0$ | $n_{10} = 1.49782$ | $\nu_{10} = 82.3$ | $L_{41}$ |
| $r_{16} = -130.821$ | $d_{16} = 10.0$ | | | |
| $r_{17} = -96.159$ | $d_{17} = 3.0$ | $n_{11} = 1.78797$ | $\nu_{11} = 47.5$ | $L_{42}$ |
| $r_{18} = -900.350$ | $d_{18} = 0.6$ | | | |
| $r_{19} = 37.000$ | $d_{19} = 6.5$ | $n_{12} = 1.51680$ | $\nu_{12} = 64.1$ | $L_{43}$ $G_4$ |
| $r_{20} = 41.623$ | $d_{20} = 66.0$ | | | |
| $r_{21} = -26.710$ | $d_{21} = 2.5$ | $n_{13} = 1.77279$ | $\nu_{13} = 49.4$ | $L_{44}$ |
| $r_{22} = -81.538$ | $d_{22} = 0.1$ | | | |
| $r_{23} = 168.000$ | $d_{23} = 2.0$ | $n_{14} = 1.73350$ | $\nu_{14} = 51.1$ $L_{4a}$ $L_{45}$ | |
| $r_{24} = 72.000$ | $d_{24} = 6.5$ | $n_{15} = 1.58144$ | $\nu_{15} = 40.8$ $L_{4b}$ | |
| $r_{25} = -55.442$ | $B_f = 69.8277$ | | | |

| | f | | |
|---|---|---|---|
| $d_l$ | 200 | 300 | 400 |
| $d_5$ | 50.635 | 91.056 | 111.267 |
| $d_{11}$ | 56.297 | 29.726 | 3.155 |
| $d_{14}$ | 15.464 | 1.614 | 7.975 |

Short distance photography $d_0 = 2492.954$

| $\beta$ | $-0.09$ | $-0.0135$ | $-0.18$ |

$f_1 = 274.652$
$f_2 = -80.276$
$f_{11} = 405.96$
$f_{12} = 850.33$
$f_{21} = -183.938$
$f_{22} = -150.242$ $$f_{21}\left(\frac{1}{f_{2a}\nu_{2a}} + \frac{1}{f_{2b}\nu_{2b}}\right) = -0.0497$$

$$f_{21}\left(\frac{1}{f_{2b}\nu_{2b}} + \frac{1}{f_{2c}\nu_{2c}}\right) = -0.0512$$

$$f_{11}\left(\frac{1}{f_{1a}\nu_{1a}} + \frac{1}{f_{1b}\nu_{1b}}\right) = -0.0051$$

where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, n_3, \ldots$ and $\nu_1, \nu_2, \nu_3, \ldots$ represent the refractive indices and Abbe numbers, respectively, of the respective lenses, $d_0$ represents the distance from the foremost lens surface to the object, $B_f$ represents the back focal length, and $f_1$ and $f_2$ represent the focal lengths of the first group ($G_1$) and the second group ($G_2$), respectively.

* * * * *